(12) United States Patent
Hayashi

(10) Patent No.: US 12,486,964 B2
(45) Date of Patent: Dec. 2, 2025

(54) ELECTRONIC DEVICE, LIGHT REFLECTING MEMBER, AND INDICATOR LAMP

(71) Applicant: SEIKO EPSON CORPORATION, Tokyo (JP)

(72) Inventor: Toshihiro Hayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/614,827

(22) Filed: Mar. 25, 2024

(65) Prior Publication Data

US 2024/0328594 A1    Oct. 3, 2024

(30) Foreign Application Priority Data

Mar. 27, 2023    (JP) ................................. 2023-050465

(51) Int. Cl.
     *F21V 7/00*      (2006.01)
     *F21V 7/04*      (2006.01)

(52) U.S. Cl.
     CPC .............. *F21V 7/0091* (2013.01); *F21V 7/04* (2013.01)

(58) Field of Classification Search
     CPC .......... F21V 13/00; F21V 13/02; F21V 13/04; F21V 7/06; F21V 7/07; F21V 7/08; F21V 7/09; F21V 7/0091; F21V 7/04
     See application file for complete search history.

(56) References Cited

U.S. PATENT DOCUMENTS

| | | | | |
|---|---|---|---|---|
| 6,616,305 | B1* | 9/2003 | Simon | F21V 5/046 362/268 |
| 7,489,453 | B2* | 2/2009 | Chinniah | F21V 7/0091 362/333 |
| 2005/0111235 | A1* | 5/2005 | Suzuki | F21S 43/315 362/555 |
| 2005/0135109 | A1* | 6/2005 | Stout | F21S 43/14 362/509 |
| 2010/0259153 | A1* | 10/2010 | Futami | F21S 43/247 313/114 |
| 2015/0016148 | A1* | 1/2015 | Chao | G02B 6/0036 362/619 |
| 2016/0312977 | A1* | 10/2016 | Jiang | F21K 9/68 |
| 2021/0053355 | A1* | 2/2021 | Usuda | B41J 2/2117 |

FOREIGN PATENT DOCUMENTS

JP      2003281907 A    * 10/2003      ............. F21S 43/26
JP      2014-151516 A      8/2014

* cited by examiner

*Primary Examiner* — Fatima N Farokhrooz
(74) *Attorney, Agent, or Firm* — WORKMAN NYDEGGER

(57) ABSTRACT

A printing apparatus as an example of an electronic device includes an indicator lamp that emits light in a predetermined color when an abnormality occurs. The indicator lamp includes a light source, and a light reflecting member on which light emitted from the light source is incident and that reflects the incident light. The light reflecting member includes a reflecting surface at which light is reflected. The reflecting surface includes a plurality of individual reflecting surfaces formed in a surface shape of at least a part of a conical surface having an axis forming a predetermined angle with respect to a traveling direction of incident light. The plurality of individual reflecting surfaces are arranged side by side in a first direction intersecting the traveling direction of the incident light.

16 Claims, 13 Drawing Sheets

ELECTRONIC DEVICE, LIGHT REFLECTING MEMBER, AND INDICATOR LAMP

The present application is based on, and claims priority from JP Application Serial Number 2023-050465, filed Mar. 27, 2023, the disclosure of which is hereby incorporated by reference herein in its entirety.

BACKGROUND

1. Technical Field

The present disclosure relates to an electronic device such as a printing apparatus including an indicator lamp, a light reflecting member used for an indicator lamp, and an indicator lamp.

2. Related Art

For example, JP-A-2014-151516 discloses a printer (an example of an electronic device) including an indicator lamp. The printer notifies a user that an abnormality has occurred by lighting or blinking the indicator lamp or by a difference in light emission color.

However, a user who monitors an operation state or a printing state of the printer described in JP-A-2014-151516 may be at a position slightly away from the printer. For this reason, it is necessary for the user to be able to check light emission such as the lighting or the blinking of the indicator lamp without missing the light emission from any position around the printer. For this purpose, it is sufficient to cause the indicator lamp to emit light with a high light amount, without being provided with directivity. However, on the other hand, it is also required that emitted light from the indicator lamp is not too bright for the user who performs working or an operation near the printer. For this reason, there is a demand for an indicator lamp that is easily visible from a position away from the printer, and is not too bright at a position close to the printer.

For example, there is a demand for an indicator lamp having light directivity, and light emission characteristics such that the indicator lamp appears bright from any position away from an electronic device such as a printer and within a certain range, and a position of an operator's eye is off from directional light at a close position. From this point of view, there is a demand for an indicator lamp by which light directivity, and uniformity of a light amount distribution in a directed range are easily ensured. In addition, in order to make the indicator lamp appear bright from any distant position, it is generally conceivable to increase a size of the indicator lamp or to form the indicator lamp into, for example, a cylindrical shape; however, it is also demanded to reduce the size of the indicator lamp or to form the indicator lamp into another shape in accordance with a size or design of an electronic device body. Note that such light emission characteristics of the indicator lamp are required not only for printers but also for other electronic devices. Similar light emission characteristics are also required for the indicator lamp in other electronic devices that are used in such a manner that a user monitors the electronic device from a position away from the electronic device or a user performs working or an operation near the electronic device.

SUMMARY

An electronic device for solving the above-described problems includes an indicator lamp configured to emit light in a predetermined color when an abnormality occurs in the electronic device, wherein the indicator lamp includes a light source configured to emit light formed of parallel light, and a light reflecting member on which light emitted from the light source is incident and that reflects the incident light, the light reflecting member includes a reflecting surface at which light is reflected, the reflecting surface includes a plurality of individual reflecting surfaces formed in a surface shape of at least a part of a conical surface or a polygonal pyramid surface having an axis forming a predetermined angle with respect to a traveling direction of incident light, and the plurality of individual reflecting surfaces are arranged side by side in a first direction intersecting the traveling direction of the incident light.

A light reflecting member for solving the above-described problems is a light reflecting member on which light formed of parallel light emitted from a light source is incident and that reflects the incident light, the light reflecting member including a reflecting surface at which light is reflected, wherein at the reflecting surface, individual reflecting surfaces formed in a surface shape of at least a part of a conical surface or a polygonal pyramid surface having an axis forming a predetermined angle with respect to a traveling direction of incident light are arranged side by side in a first direction intersecting the traveling direction of the incident light.

An indicator lamp for solving the above-described problems is an indicator lamp in the above-described electronic device, including the light source, and the light reflecting member.

DESCRIPTION OF EMBODIMENTS

Figure 1:
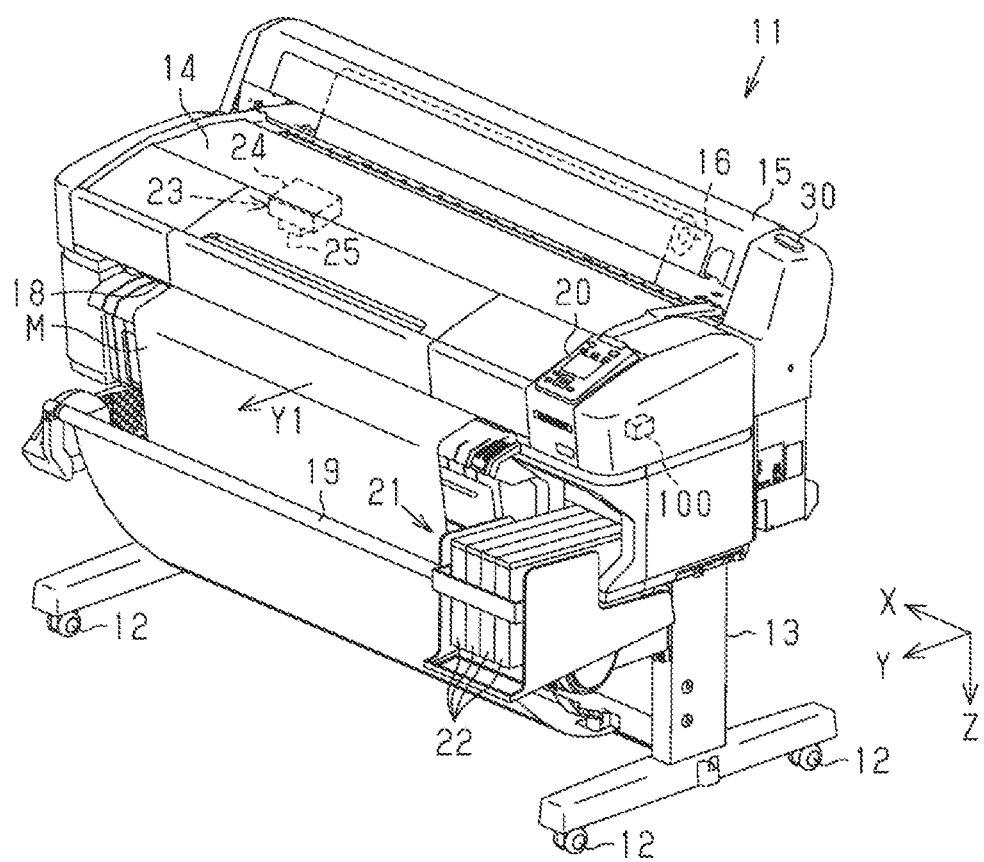
FIG. 1 is a perspective view illustrating a printing apparatus in an embodiment.

An embodiment in which an electronic device to which an indicator lamp is applied is a printing apparatus will be described below with reference to the accompanying drawings. As illustrated in FIG. 1, a printing apparatus 11 of the embodiment is a serial scan type (serial printing type) printer. The printing apparatus 1 is, for example, a large format printer. The printing apparatus 11 is an ink jet printer that forms a dot group on a medium M such as paper or cloth by causing liquid droplets (for example, ink) to be discharged in accordance with image data included in print data supplied from an external host computer, and thereby prints an image (including characters, figures, and the like).

Note that in the embodiment, in the printing apparatus 11, directions parallel to three axes XYZ orthogonal to each other are referred to as a width direction X, a transport direction Y, and a vertical direction Z, respectively. The width direction X is a direction indicating a width of the printing apparatus 11 when the printing apparatus 11 is viewed from a front side. The transport direction Y is a direction in which the medium M is transported at a printing position facing a printing unit 23. Note that in the example of FIG. 1, a vertically upward direction is a height direction Z.

Configuration of Printing Apparatus 11

First, a schematic configuration of the printing apparatus 11 will be described with reference to FIG. 1. As illustrated in FIG. 1, the printing apparatus 11 includes a support stand 13 having casters 12 attached to a lower end thereof, and a substantially rectangular parallelepiped housing 14 supported by the support stand 13. The housing 14 includes a feeding unit 15 at a rear portion thereof. In the feeding unit 15, a roll body 16 around which the medium M such as elongated paper or fabric is rolled up in a cylindrical manner is loaded. The feeding unit 15 feeds the medium M from the roll body 16. The fed medium M is transported in a transport direction Y1 indicated by an arrow in FIG. 1 by a transport unit (not illustrated) in the housing 14. Note that the transport direction Y1 changes depending on position of the medium M on a transport path. Therefore, the transport direction Y indicates the transport direction Y1 at the printing position.

The printing unit 23 prints characters or images on the medium M at the printing position in the housing 14. The medium M after printing is cut to a predetermined length and then discharged from a discharge port 18. The discharged medium M is accommodated in a medium receiving unit 19. Note that the medium M after printing may be rolled up as a roll body without being cut.

Additionally, an operating panel 20 is provided at an end portion of an upper surface of the housing 14. The operating panel 20 includes a display unit and operation buttons. Menus, messages, and the like are displayed on the display unit. The messages include one for notifying a user of an operation state of the printing apparatus 11, or the like. By operating the operating panel 20, the user performs various instructions including a print instruction to the printing apparatus 11.

The printing apparatus 11 includes a control unit 100 that controls the feeding unit 15, the transport unit, and the printing unit 23. The control unit 100 controls the printing apparatus 11 based on print data received from a host device (not illustrated) or a print instruction instructed by an operation of the operating panel 20.

A liquid supply unit 21 is provided at a lower portion of one end of the housing 14. A plurality of (four in the example of FIG. 1) liquid containing units 22 (for example, ink cartridges or ink tanks) that contain ink as an example of liquid are detachably attached to the liquid supply unit 21. The plurality of liquid containing units 22 contain different types (for example, colors) of liquid (for example, ink), respectively. In an example in which liquid is ink, the plurality of liquid containing units 22 each contain one color of ink of a plurality of colors of ink including, for example, black (K), cyan (C), magenta (M), and yellow (Y).

The printing unit 23 includes a carriage 24 configured to be movable in the width direction X, and the printing head 25 arranged at the carriage 24. The printing head 25 may be, for example, an ink jet printing head. In this case, the printing head 25 performs printing on the medium M by discharging liquid (ink) of colors supplied from the liquid containing units 22 through tubes (not illustrated). The carriage 24 supports the printing head 25 at a position facing the transport path of the medium M. As illustrated in FIG. 1, the printing head 25 may be arranged below the carriage 24. The printing head 25 discharges liquid droplets (ink droplets) toward the medium M to perform printing on the medium M. Note that the printing apparatus 11 is not limited to an off-carriage type configuration in which the liquid supply unit 21 is attached to the housing 14, and may have an on-carriage type configuration in which the plurality of liquid containing units 22 are attached to the carriage 24.

As illustrated in FIG. 1, the printing apparatus 11 includes an indicator lamp 30 that emits light in a predetermined color when an abnormality occurs in the printing apparatus 11. The indicator lamp 30 is arranged, for example, at an upper portion of the housing 14. The indicator lamp 30 may blink when an abnormality occurs in the printing apparatus 11. The light emission or the blinking of the indicator lamp 30 is controlled by the control unit 100. The control unit 100 monitors an operation state of the printing apparatus 11, and causes the indicator lamp 30 to emit light when detecting an abnormality based on a monitoring result. Examples of the detected abnormality include exhaustion of the remaining roll body 16, exhaustion of remaining ink, detection of inappropriate printing conditions, and detection of a jam.

The indicator lamp 30 functions as an indicator for notifying a user of an operation state of the printing apparatus 11 or occurrence of an abnormality. Therefore, the indicator lamp 30 has light emission characteristics so as to be easily visually recognized by the user. For example, the indicator lamp 30 has light emission characteristics so as to be easily visually recognized by the user when viewed from any direction around the printing apparatus 11.

Further, the indicator lamp 30 may emit light in a plurality of colors. In this case, light emitters 31 (see FIG. 3), which will be described later, for a plurality of colors of the indicator lamp 30 may be provided, or a configuration may be adopted in which one light emitter 31 has, for example, LEDs of a plurality of colors built-in. The light emitter 31 may have a plurality of colors including at least two colors of three RGB colors, for example. In this case, the control unit 100 may cause the LEDs of the plurality of colors to emit light separately in a color by color manner, or may cause the LEDs of the plurality of colors to emit light at the same time to emit light of a mixed color. In addition, the control unit 100 may switch between emission colors of the indicator lamp 30 according to notification contents. For example, when an abnormality occurs in the printing apparatus 11, the indicator lamp 30 may be caused to emit light in red, and may be caused to emit light in another color such as blue, green, yellow, or orange when the notification contents have less urgency or severity than the abnormality.

Schematic Configuration of Indicator Lamp 30

Figure 2:
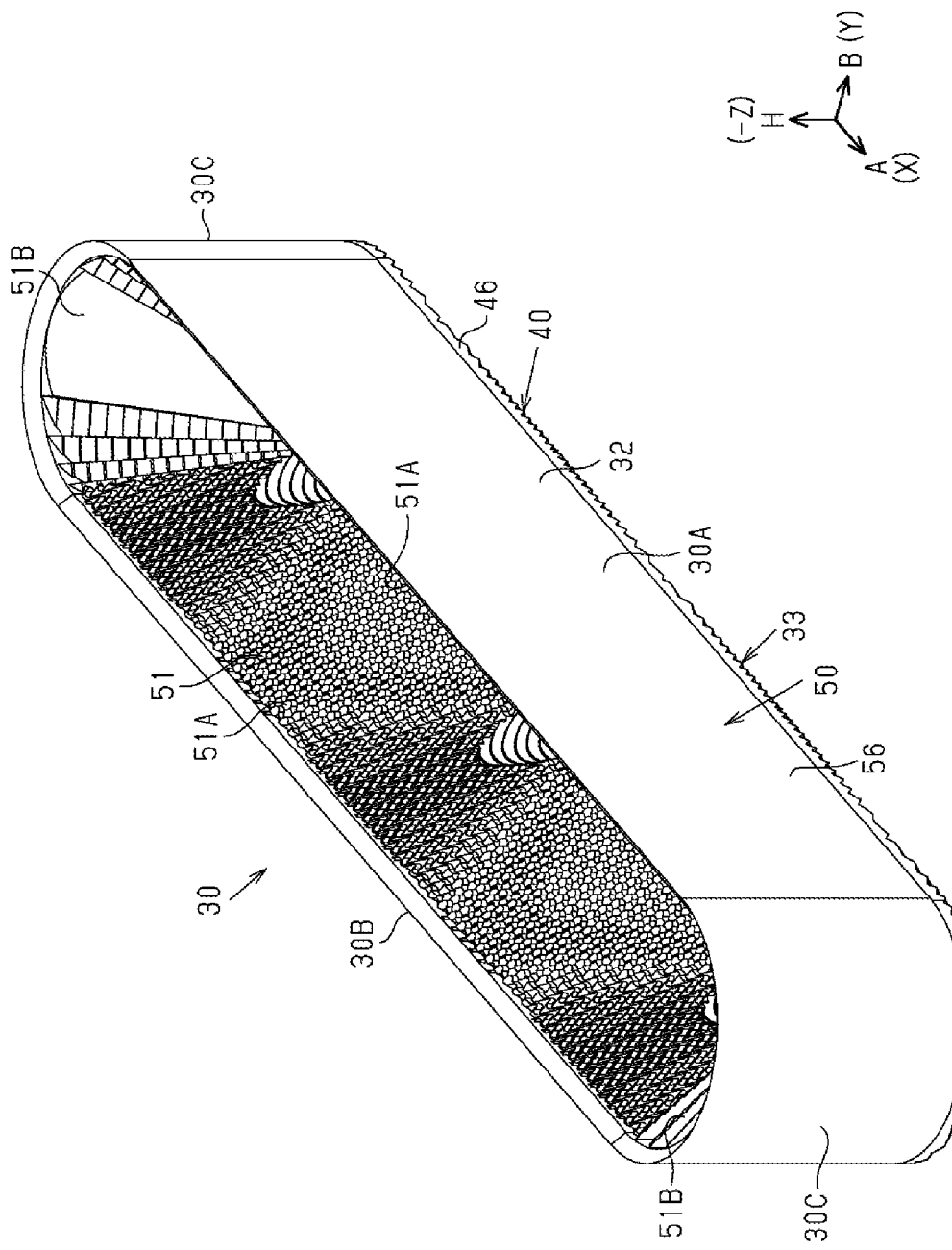
FIG. 2 is a perspective view illustrating an indicator lamp.
Figure 3:
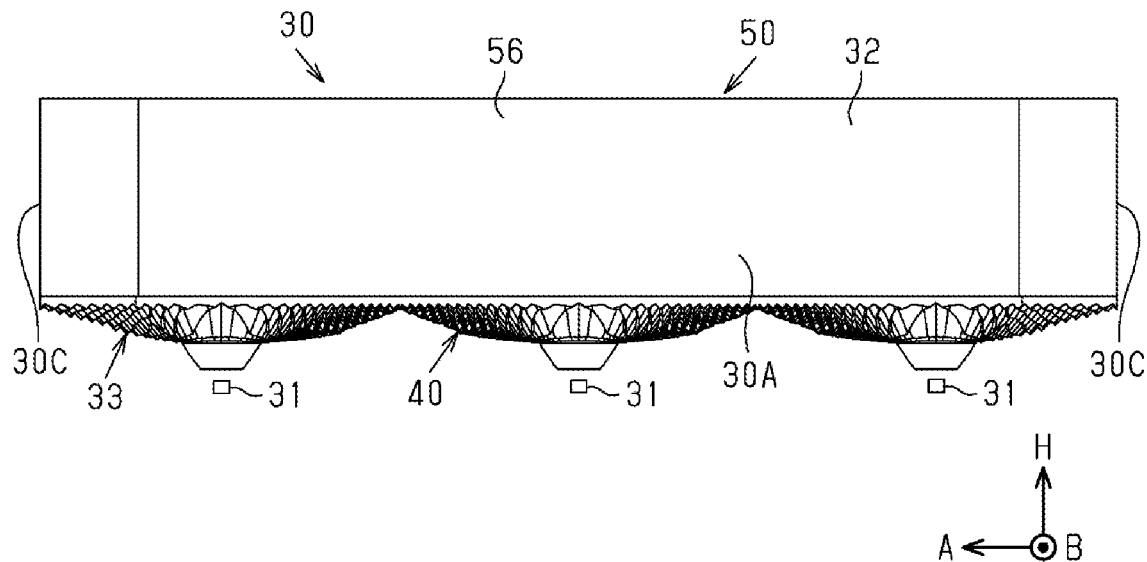
FIG. 3 is a front view illustrating the indicator lamp.
Figure 4:
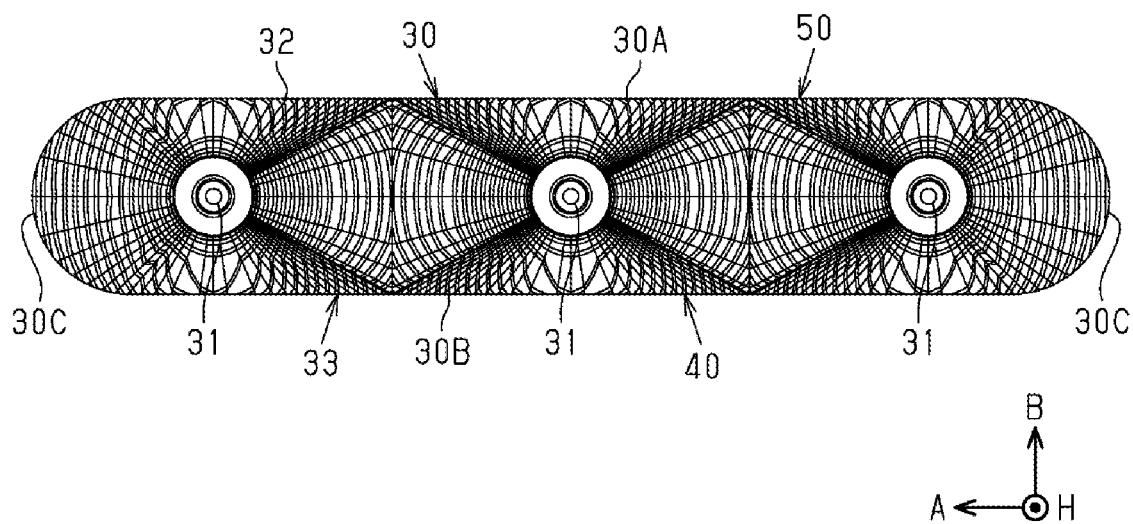
FIG. 4 is a bottom view illustrating the indicator lamp.
Figure 5:
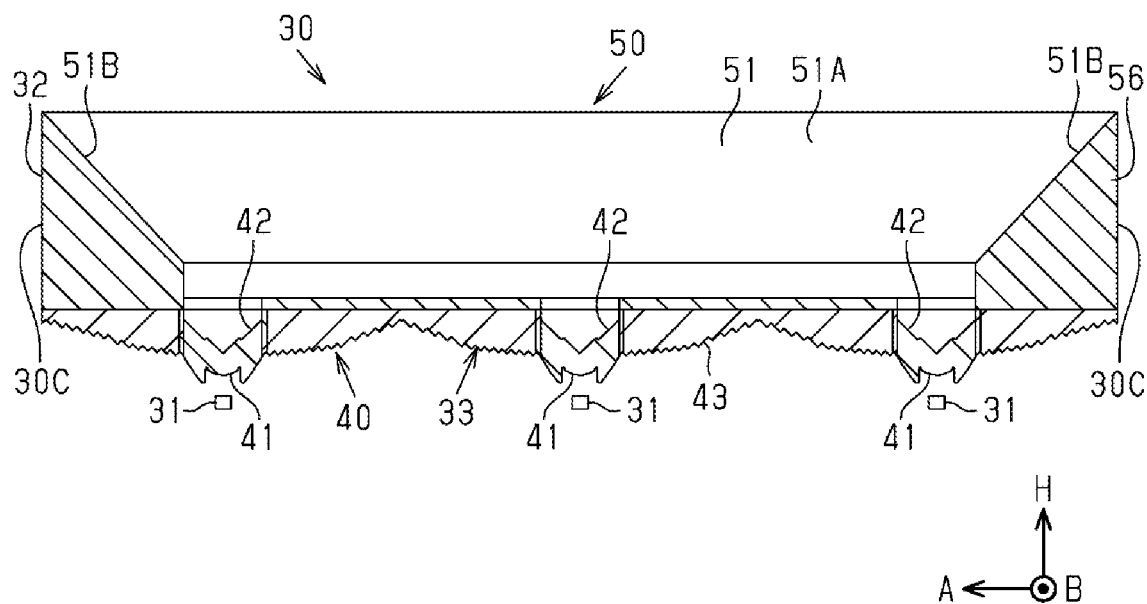
FIG. 5 is a front cross-sectional view illustrating the indicator lamp.
Figure 6:
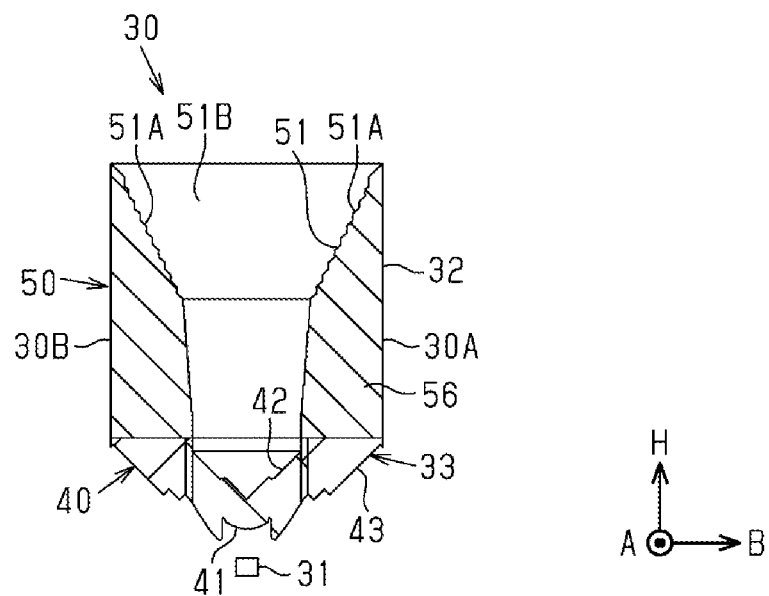
FIG. 6 is a side cross-sectional view illustrating the indicator lamp.

Next, a configuration of the indicator lamp 30 will be described with reference to FIGS. 2 to 6. Here, FIG. 2 illustrates the indicator lamp 30 viewed obliquely from above. FIG. 3 illustrates a front side of the indicator lamp 30, and FIG. 4 illustrates a bottom surface of the indicator lamp 30. FIG. 5 illustrates a front cross-section of the indicator lamp 30, and FIG. 6 illustrates a side cross-section of the indicator lamp 30. Note that, a longitudinal direction of the indicator lamp 30 is an A direction, a short direction is a B direction, and a height direction is an H direction. The A direction is also referred to as a longitudinal direction A, the B direction is also referred to as a short direction B, and the H direction is also referred to as a height direction H. In a state in which the indicator lamp 30 is arranged at the housing 14 of the printing apparatus 11, the A direction corresponds to the width direction X, the B direction corresponds to the transport direction Y, and the H direction corresponds to a-Z direction which is a direction opposite to the vertical direction Z.

As illustrated in FIG. 2, the indicator lamp 30 has a shape elongated in one direction. The indicator lamp 30 is configured such that a side peripheral surface 32 emits light. The side peripheral surface 32 of the indicator lamp 30 includes a front surface 30A, a back surface 30B, and a pair of side end surfaces 30C. The front surface 30A and the and the back surface 30B are each a rectangular surface elongated in the longitudinal direction A. The side end surface 30C has a curved surface that is convex outward in the width direction X (convex curved surface).

The indicator lamp 30 includes the light emitter 31 (FIG. 3), an optical path conversion member 40, and a light reflecting member 50. As illustrated in FIGS. 3 and 4, the indicator lamp 30 includes a plurality of (for example, three) the light emitters 31 (see FIG. 3) along the longitudinal direction A on a bottom surface side thereof.

As illustrated in FIGS. 2 and 3, the optical path conversion member 40 and the light reflecting member 50 are integrally fixed. The optical path conversion member 40 is a light guide component 46 made of a transparent resin material. The light reflecting member 50 is a light guide component 56 made of a transparent resin material. Each of the light guide components 46 and 56 is formed as one member for the plurality of light emitters 31. The light guide components 46 and 56 may be made of the same transparent resin material, or made of different transparent resin materials, respectively. The light guide components 46 and 56 may be made of a colored transparent resin material.

The optical path conversion member 40 illustrated in FIGS. 2 and 3 is a light guide that converts light from the light emitter 31 into parallel light in the height direction H. On the light reflecting member 50, light emitted from the light emitter 31 (see FIG. 3) is incident, and the light reflecting member 50 reflects the incident light. The light reflecting member 50 has a function of reflecting light incident from the optical path conversion member 40 in a direction for a user to easily visually recognize the light. The direction for the user to easily visually recognize the light indicates a direction from a position of the indicator lamp 30 in the printing apparatus 11 toward a height of eyes of the user in standing posture around the printing apparatus 11. In this way, the indicator lamp 30 emits directional light from the side peripheral surface 32. Note that the light emitter 31 and the optical path conversion member 40 constitute a light source 33 that emits parallel light.

The optical path conversion member 40 and the light reflecting member 50 are coupled to each other via, for example, an optically transparent adhesive. The light emitter 31 is assembled as a light emitter unit (not illustrated) separate from the optical path conversion member 40 and the light reflecting member 50. The light emitter unit may be assembled on either the optical path conversion member 40 side or the housing 14 side.

As illustrated in FIGS. 1, 5, and 6, an upper surface of the indicator lamp 30 includes a reflecting surface 51 concave in a –H direction. The reflecting surface 51 includes a pair of first reflecting surfaces 51A facing each other in the short direction B, and a pair of second reflecting surfaces 51B facing each other in the longitudinal direction A. The pair of first reflecting surfaces 51A are surfaces inclined in directions so that a distance by which the pair of first reflecting surfaces 51A face decreases on a lower side in the height direction H. The pair of second reflecting surfaces 51B are surfaces inclined in directions so that a distance by which the pair of first reflecting surfaces 51A face decreases on a lower side in the height direction H. The reflecting surface 51 includes an uneven surface including a large number of irregularities arranged at substantially the entire surface. Note that the light reflecting member 50 may be formed by integrating a portion of the reflecting surface 51 and other portions, or may be formed by combining members manufactured as separate members.

Schematic Configuration of Optical Path Conversion Member 40 and Light Reflecting Member 50

Next, a schematic configuration of the optical path conversion member 40 and the light reflecting member 50 will be described with reference to FIGS. 3 to 6. As illustrated in FIG. 5, the optical path conversion member 40 converts light from the light emitter 31 into a parallel light flux and makes the parallel light flux incident on the light reflecting member 50. As illustrated in FIGS. 3 to 5, the three light emitters 31 are assembled to the optical path conversion member 40 at three locations along the longitudinal direction A thereof. The light emitter 31 emits light radially. The optical path conversion member 40 converts the radial light emitted by the light emitter 31 into a parallel light flux in the height direction H.

As illustrated in FIGS. 5 and 6, the optical path conversion member 40 includes a lens portion 41 at a position facing the light emitter 31 in the height direction H. The optical path conversion member 40 includes a first inclined reflecting surface 42 that reflects parallel light condensed by the lens portion 41, and a second inclined reflecting surface 43 that reflects the parallel light from the first inclined reflecting surface 42. In the optical path conversion member 40, a parallel light flux reflected by the second inclined reflecting surface 43 is incident on the light reflecting member 50.

In the light reflecting member 50, the parallel light flux incident from the optical path conversion member 40 is reflected at the reflecting surface 51. That is, the light reflecting member 50 emits light from the front surface 30A and the back surface 30B by the pair of first reflecting surfaces 51A reflecting the parallel light fluxes incident from the optical path conversion member 40. In addition, the light reflecting member 50 emits light from the pair of side end surfaces 30C by the pair of second reflecting surfaces 51B reflecting the parallel light fluxes incident from the optical path conversion member 40.

Function of Indicator Lamp 30

The indicator lamp 30 has an elliptical or oval shape in plan view. Similarly, the optical path conversion member 40 and the light reflecting member 50 each have an elliptical shape or an oval shape in plan view. As described above, when the indicator lamp 30 has a shape elongated in one direction, a light emitting area is greater when a user looks at the front surface 30A or the back surface 30B of the indicator lamp 30 than when the user looks at the side end surface 30C. For this reason, when the user looks at the front surface 30A or the back surface 30B of the indicator lamp 30, the light emission is less likely to be overlooked. However, the user looks at the indicator lamp 30 in standing posture within a predetermined distance range from the printing apparatus 11. Therefore, light is emitted also in directions at which the user does not look, and the light is not efficiently used.

On the other hand, when the user looks at the indicator lamp 30 from a lateral side of the printing apparatus 11, the light emitting area is small because the user looks at the side end surface 30C. With the small light emitting area, even when a light amount per unit area of the indicator lamp 30 is the same, the user easily misses the light emission of the indicator lamp 30.

Therefore, in the indicator lamp 30 of the embodiment, directivity is given to light emitted from the side peripheral surface 32 in a direction required for each surface. That is, each of the front surface 30A and the back surface 30B has narrow directivity directed to the height of the user's eyes in the vertical direction Z, and is directed to a wide range in the horizontal direction so that a light amount distribution is uniform.

In addition, when light is emitted in a direction perpendicular to the side end surface 30C formed of a curved surface, the light spreads. In this case, the user sees the side end surface 30C of the indicator lamp 30 relatively dark. Therefore, the side end surface 30C has narrow directivity directed to the height of the user's eyes in the vertical direction Z, and has narrow directivity directed to the X direction in the horizontal direction.

Such light emission characteristics different for each surface of the indicator lamp 30 are achieved mainly by a structure of the light reflecting member 50. That is, the pair of first reflecting surfaces 51A reflect light with narrow directivity directed to the height of the eyes of the user in the vertical direction Z, and reflect light with a uniform light amount distribution over a wide range in the horizontal direction. On the other hand, the pair of second reflecting surfaces 51B reflect light with narrow directivity directed to the height of the user's eyes in the vertical direction Z, and reflect light with a uniform light amount distribution in a narrow range directed to the longitudinal direction A in the horizontal direction. Note that a detailed configuration of each of the optical path conversion member 40 and the light reflecting member 50 will be described later.

Figure 7:
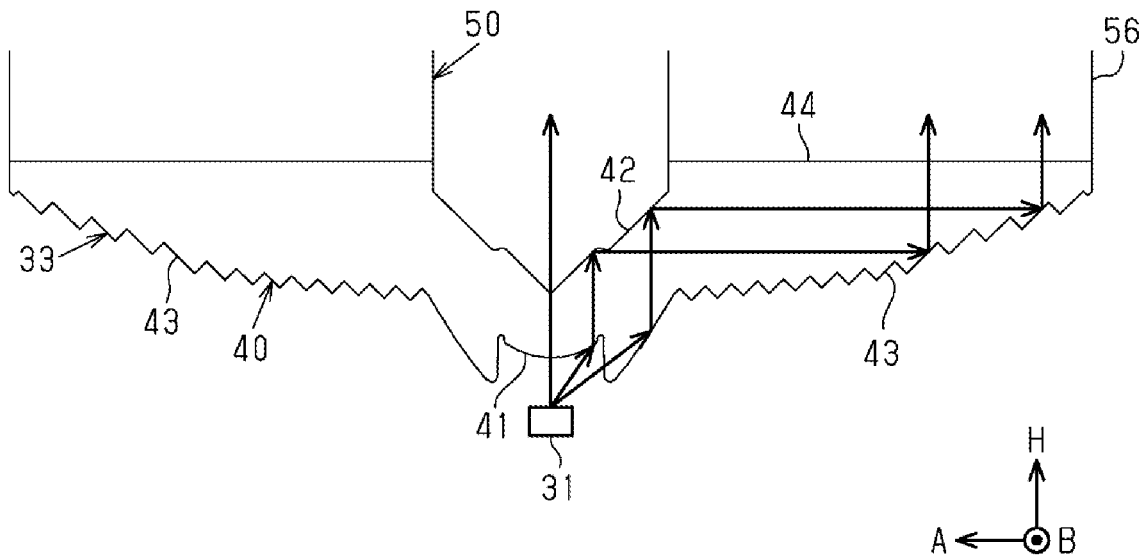
FIG. 7 is a partial front view illustrating an optical path in the indicator lamp.

Next, with reference to FIGS. 7 and 8, a description will be given of a function of the optical path conversion member 40 for converting light from the light emitter 31 into a parallel light flux to be incident on the light reflecting member 50. FIG. 7 illustrates an optical path when the optical path conversion member 40 converts light from the light emitter 31 into a parallel light flux parallel to the height direction H. Further, FIG. 8 describes a function of the optical path conversion member 40 for adjusting a light amount of a parallel light flux incident on the light reflecting member 50 in accordance with a distance from the light emitter 31 in the A direction.

As illustrated in FIG. 7, the light from the light emitter 31 is guided by the optical path conversion member 40, and is emitted from the optical path conversion member 40 in the height direction H. The optical path conversion member 40 guides the light from the light emitter 31 in a direction orthogonal to the upper surface (an installation surface) of the housing 14 at which the indicator lamp 30 is arranged. That is, the optical path conversion member 40 is a light guide that guides the light from the light emitter 31 upward in the vertical direction Z. The optical path conversion member 40 converts the light from the light emitter 31 into a parallel light flux and makes the parallel light flux incident on the light reflecting member 50.

Configuration of Optical Path Conversion Member 40

Next, a detailed configuration of the optical path conversion member 40 will be described with reference to FIGS. 7 and 8. As illustrated in FIG. 7, the optical path conversion member 40 includes the lens portion 41, the first inclined reflecting surface 42, the second inclined reflecting surface 43 described above, and a light transmission interface 44. The lens portion 41 condenses radial light from the light emitter 31 as parallel light (a light flux) parallel to the height direction H. The first inclined reflecting surface 42 reflects, at a plurality of different height positions in the height direction H, the parallel light traveling in the lens portion 41 as parallel light traveling in the horizontal direction parallel to the A direction.

The second inclined reflecting surface 43 converts a direction of optical paths such that optical paths of the parallel light traveling in the horizontal direction at a plurality of positions having different distances from the light emitter 31 in the A direction are converted to optical paths in which the parallel light travels in the height direction H. The light transmission interface 44 is an interface at which a parallel light flux reflected by the second inclined reflecting surface 43 in the optical path conversion member 40 and traveling in the height direction H is incident on the light reflecting member 50 from the optical path conversion member 40. Since the light transmission interface 44 is orthogonal to the direction in which the parallel light flux from the second inclined reflecting surface 43 travels, the parallel light flux parallel to the height direction H is incident on the light reflecting member 50 as is without being substantially refracted at the light transmission interface 44.

Figure 8:
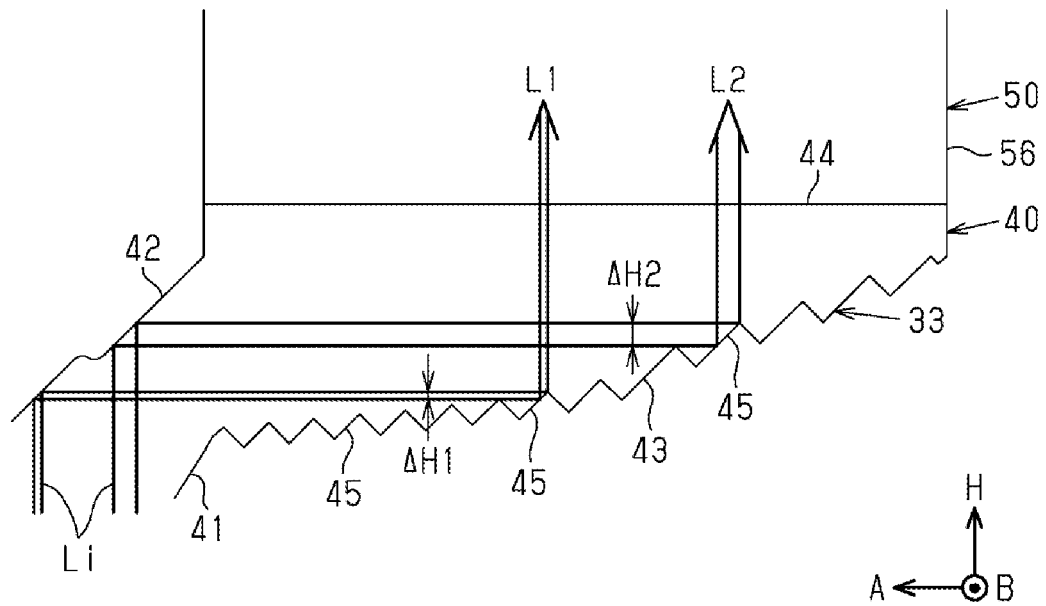
FIG. 8 is a partial front view illustrating an optical path in an optical path conversion member.

As illustrated in FIG. 8, the second inclined reflecting surface 43 includes a plurality of stepped reflecting surfaces 45 each changing a light amount of a parallel light flux parallel to the H direction in accordance with a distance from the light emitter 31 in the A direction. In the plurality of stepped reflecting surfaces 45, parallel light from the first inclined reflecting surface 42 is reflected so that a light amount of a parallel light flux parallel to the H direction increases as a distance from the light emitter 31 in the A direction increases. A light amount of a reflected parallel light flux is set to be greater on the stepped reflecting surface 45 at a position where a distance from the light emitter 31 in the A direction is longer than a predetermined distance than on the stepped reflecting surface 45 at a position where a distance from the light emitter 31 in the A direction is shorter than the predetermined distance.

As illustrated in FIG. 8, in the plurality of stepped reflecting surfaces 45, the stepped reflecting surfaces 45 increase stepwise in height of apex in accordance with the distance from the light emitter 31 in the A direction. A difference in height between apexes of the two stepped reflecting surfaces 45 adjacent to each other in the A direction increases stepwise in accordance with the distance from the light emitter 31.

Here, the difference in height between the apexes of the two adjacent stepped reflecting surfaces 45 is defined as $\Delta H$. A first difference $\Delta H1$ at a position where a distance from the light emitter 31 in the A direction is smaller than a predetermined value is smaller than a second difference $\Delta H2$ at a position where a distance from the light emitter 31 in the A direction is greater than the predetermined value. That is, the second difference $\Delta H2$ is set to be greater than the first difference $\Delta H1$ in accordance with the distance from the light emitter 31.

Therefore, parallel light traveling in the horizontal direction, which is incident light Li reflected by the first inclined reflecting surface 42, is reflected in an area corresponding to the difference $\Delta H$ in height between the two adjacent stepped reflecting surfaces 45. Therefore, an area in which parallel light traveling in the horizontal direction can be reflected is greater for the second difference $\Delta H2$ than for the first difference $\Delta H1$. Therefore, as the distance from the light emitter 31 in the A direction increases, the light amount of the parallel light flux reflected by the stepped reflecting surface 45 in the H direction increases.

The reason the light amount of the parallel light flux is adjusted in accordance with the distance from the light emitter 31 in the A direction is that intensity of light is attenuated in accordance with the distance from the light emitter 31. When the adjustment of the light amount is not performed, a light amount decreases at a position farther from the light emitter 31, and a portion that reflects the light having the small light amount becomes relatively dark. That is, a distribution of brightness variation occurs in the front surface 30A and the back surface 30B of the indicator lamp 30. Such a distribution of brightness variation of the indicator lamp 30 may cause a user to overlook light emission of the indicator lamp 30.

For this reason, as illustrated in FIG. 8, the plurality of stepped reflecting surfaces 45 are formed such that the second difference $\Delta H2$ which is the difference in height at the position distant from the light emitter 31 is greater than the first difference $\Delta H1$ which is the difference in height at a position close to the light emitter 31. As a result, a parallel light flux L1 of a first light amount is reflected by a portion of the stepped reflecting surface 45 having an area corresponding to the first difference $\Delta H1$. In addition, a parallel light flux L2 of a second light amount greater than the first light amount is reflected by a portion of the stepped reflecting surface 45 having an area corresponding to the second difference $\Delta H2$. The reflecting surface 51 of the light reflecting member 50 reflects the parallel light fluxes L1 and L2 so that a light emitting surface of the indicator lamp 30 is caused to emit light with a uniform brightness distribution.

Configuration of Light Reflecting Member 50

Next, a detailed configuration of the light reflecting member 50 will be described with reference to FIGS. 9 to 13.

Figure 9:
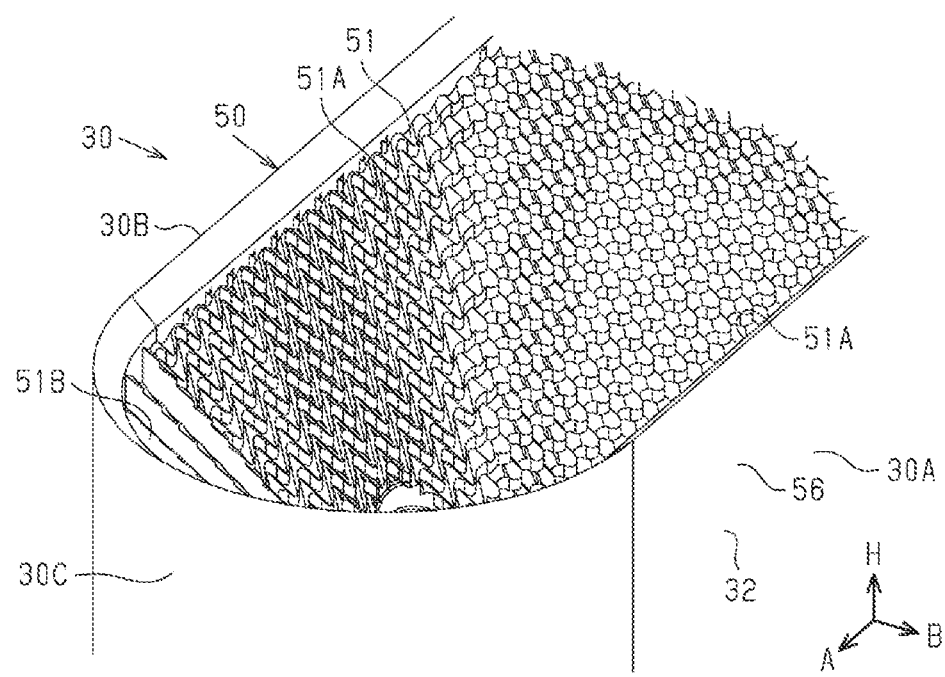
FIG. 9 is a partial perspective view of the indicator lamp viewed obliquely from above.

As illustrated in FIG. 9, the upper surface of the indicator lamp 30 includes the concave reflecting surface 51 recessed in the −H direction. The reflecting surface 51 includes the pair of first reflecting surfaces 51A facing each other in the B direction (short direction) and the pair of second reflecting surfaces 51B facing each other in the A direction (longitudinal direction). The pair of first reflecting surfaces 51A are surfaces inclined in directions so that a distance by which the pair of first reflecting surfaces 51A face decreases on a lower side in the vertical direction Z. The pair of second reflecting surfaces 51B are surfaces inclined in directions so that a distance by which the pair of first reflecting surfaces 51A face decreases on a lower side in the height direction H. The reflecting surface 51 is formed in an uneven surface including a large number of convex surfaces and concave surfaces arranged at the entire surface.

The pair of first reflecting surfaces 51A are surfaces that reflect parallel light from the optical path conversion member 40 (see FIGS. 7 and 8) mainly toward the front surface 30A and the back surface 30B. Reflected light reflected by the pair of first reflecting surfaces 51A is mainly emitted from the front surface 30A and the back surface 30B. Further, the pair of second reflecting surfaces 51B are surfaces that reflect parallel light from the optical path conversion member 40 mainly toward the pair of side end surfaces 30C. Reflected light reflected by the pair of second reflecting surfaces 51B is mainly emitted from the pair of side end surfaces 30C.

Figure 10:
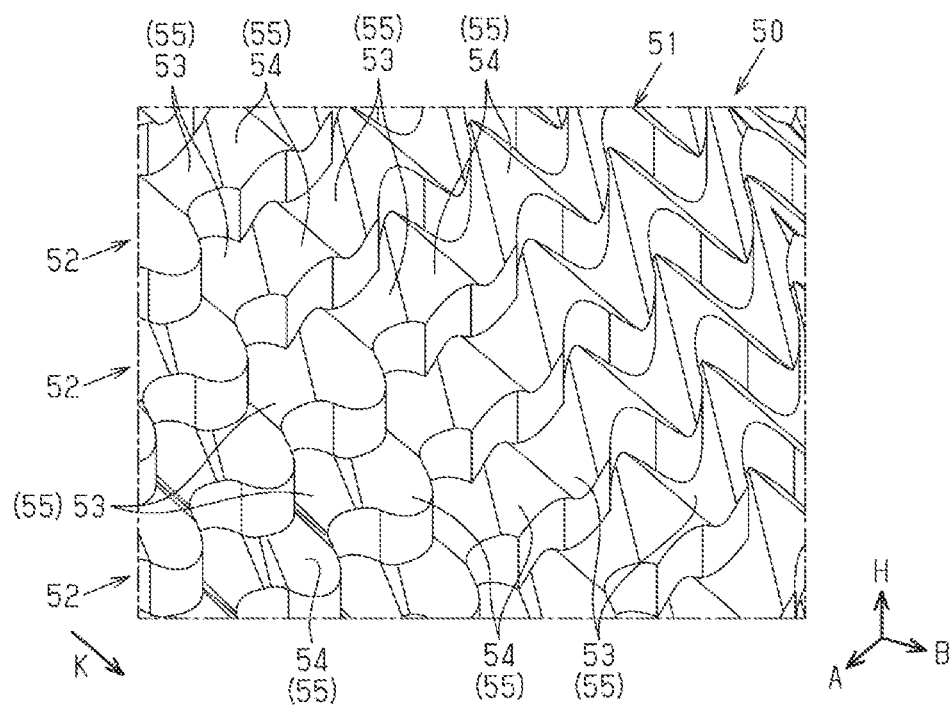
FIG. 10 is an enlarged perspective view of a reflecting surface viewed from a front surface side opposite to a light source.

As illustrated in FIG. 10, at the reflecting surface 51, a plurality of individual reflecting surface rows 52 each including a plurality of individual reflecting surfaces 55 arranged in a row along the first direction A are arranged in a second direction K when viewed obliquely from above. The individual reflecting surface 55 is a minimum unit of the reflecting surface 51. That is, the reflecting surface 51 includes the plurality of individual reflecting surfaces 55 formed in a surface shape of at least a part of a conical surface C having an axis forming a predetermined angle with respect to a traveling direction of incident light. The embodiment is particularly an example in which the predetermined angle is 0 degrees. That is, the axis of the conical surface C is parallel to the traveling direction of the incident light. The plurality of individual reflecting surfaces 55 are arranged side by side in the first direction A intersecting the traveling direction of the incident light. As described above, the reflecting surface 51 is constituted by a large number of the individual reflecting surfaces 55 arrayed vertically and horizontally in the first direction A and the second direction K over the entire surface thereof. The large number of individual reflecting surfaces 55 are densely arranged without gaps as much as possible. In addition, a surface shape, an arrangement angle, a direction, and the like of each of the large number of individual reflecting surfaces 55 are set such that light can be reflected in a directed direction forming a predetermined angle with respect to a horizontal plane (for example, a surface at which the housing 14 is installed).

As illustrated in FIG. 10, the individual reflecting surface 55 of the embodiment is constituted by a convex reflecting surface 53 and a concave reflecting surface 54. The convex reflecting surface 53 is a reflecting surface having a convex shape protruding downward (in the −H direction). The concave reflecting surface 54 is a reflecting surface having a concave shape recessed upward (in a +H direction). The convex reflecting surface 53 has the same surface shape as that of a part of the conical surface C. Similarly, the concave reflecting surface 54 has the same surface shape as that of a part of the conical surface C.

The two individual reflecting surface rows 52 adjacent to each other in the second direction K are adjacent to each other with a step, that is, are different in height by one step. A boundary that is the step between the two adjacent individual reflecting surface rows 52 is formed in a wavy shape by partially removing a portion on an apex side of the virtual conical surface C defining the surface shape of each individual reflecting surface 55, or partially removing or swelling a portion on a bottom surface side of the virtual conical surface C. In other words, the two adjacent individual reflecting surface rows 52 are adjacent to each other via the wavy boundary.

In FIG. 10, light from the light emitter 31 is directed upward in the vertical direction Z via the optical path conversion member 40 and incident on a rear surface of the reflecting surface 51, and reflected light reflected by the rear surface of the reflecting surface 51 is emitted from the side peripheral surface 32 of the indicator lamp 30. Reflected light reflected by rear surfaces of the convex reflecting surface 53 and the concave reflecting surface 54 is emitted from the side peripheral surface 32 of the indicator lamp 30 in a substantially horizontal direction.

Here, the light reflecting member 50 is made of a transparent resin material. The reflection of light at the reflecting surface 51 is performed using reflection due to a difference in refractive index between the resin material and the atmosphere. Here, in order to increase emission efficiency, the reflecting surface 51 of the light reflecting member 50 may be processed to reflect light. Specifically, a reflective processed layer may be formed as film at a front surface of the reflecting surface 51 on an air layer side.

Figure 11:
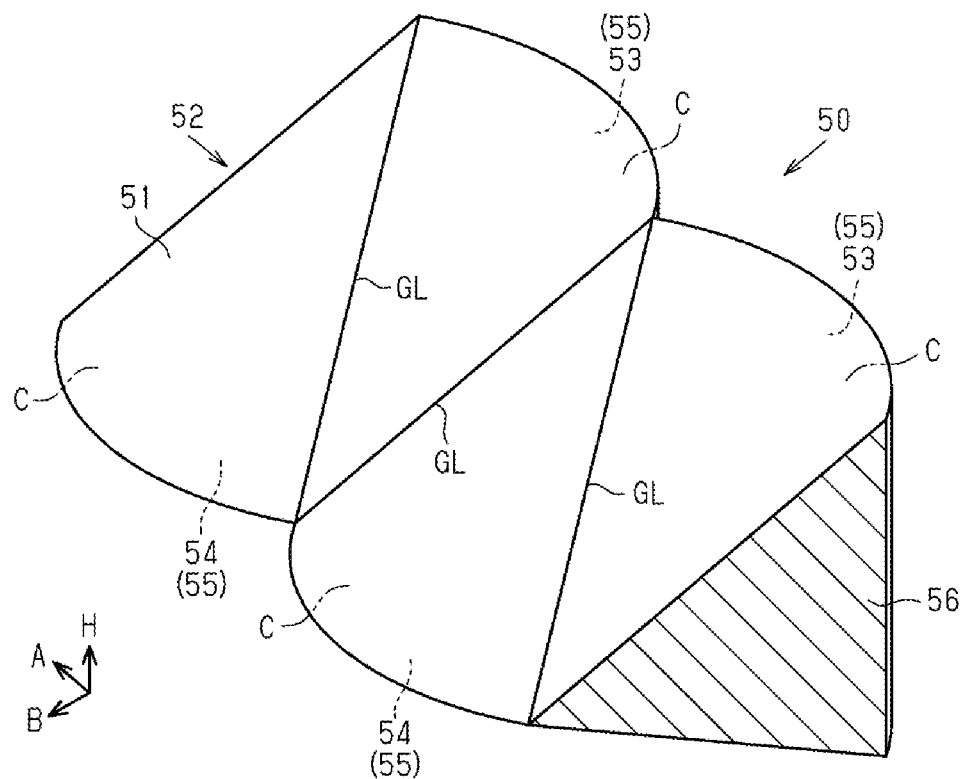
FIG. 11 is a perspective view illustrating a part of the reflecting surface.

FIG. 11 is an enlarged perspective view of a part of the individual reflecting surface row 52. Note that in FIG. 11, the individual reflecting surface 55 constituting the individual reflecting surface row 52 is drawn so as to have a surface shape of a part of the virtual conical surface C (see FIG. 10), and a point that a boundary BL is formed in a wavy shape at a coupling portion between the two individual reflecting surface rows 52 adjacent to each other in the second direction K is omitted. As illustrated in FIG. 11, the reflecting surface 51 of the light reflecting member 50 includes the individual reflecting surface row 52 in which the convex reflecting surface 53 and the concave reflecting surface 54 are arranged side by side in the first direction A in a state where generating lines GL are coupled to each other.

Figure 12:
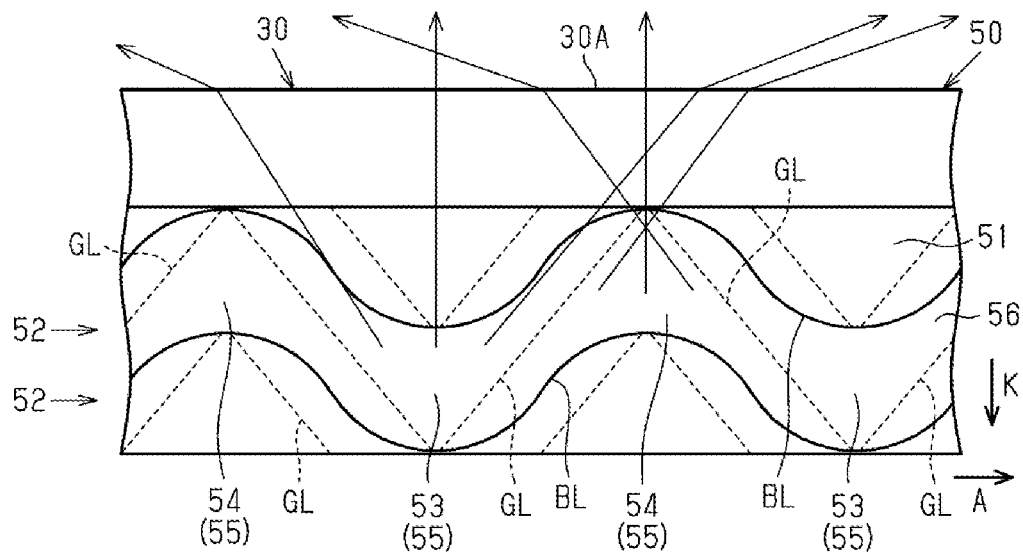
FIG. 12 is a partial plan view illustrating the reflecting surface.

As illustrated in FIG. 12, a plurality of the individual reflecting surface rows 52 are arranged in the second direction K intersecting the first direction A. In FIG. 12, parallel light from the optical path conversion member 40 is incident from a back side to a front side in a direction orthogonal to a paper surface of the drawing. The incident parallel light is reflected by the convex reflecting surface 53 and the concave reflecting surface 54, and the reflected light is emitted from the front surface 30A along optical paths indicated by arrows in FIG. 12.

As illustrated in FIG. 12, the parallel light incident on the convex reflecting surface 53 is reflected by a truncated conical surface of the convex reflecting surface 53. Therefore, the light reflected by the convex reflecting surface 53 spreads at a predetermined spread angle. Further, the reflected light reflected by the concave reflecting surface 54 also spreads. Light emitted from the front surface 30A of the indicator lamp 30 is refracted in a direction corresponding to each incident angle in a process of passing through the front surface 30A.

Configuration of Convex Reflecting Surface 53

Figure 13:
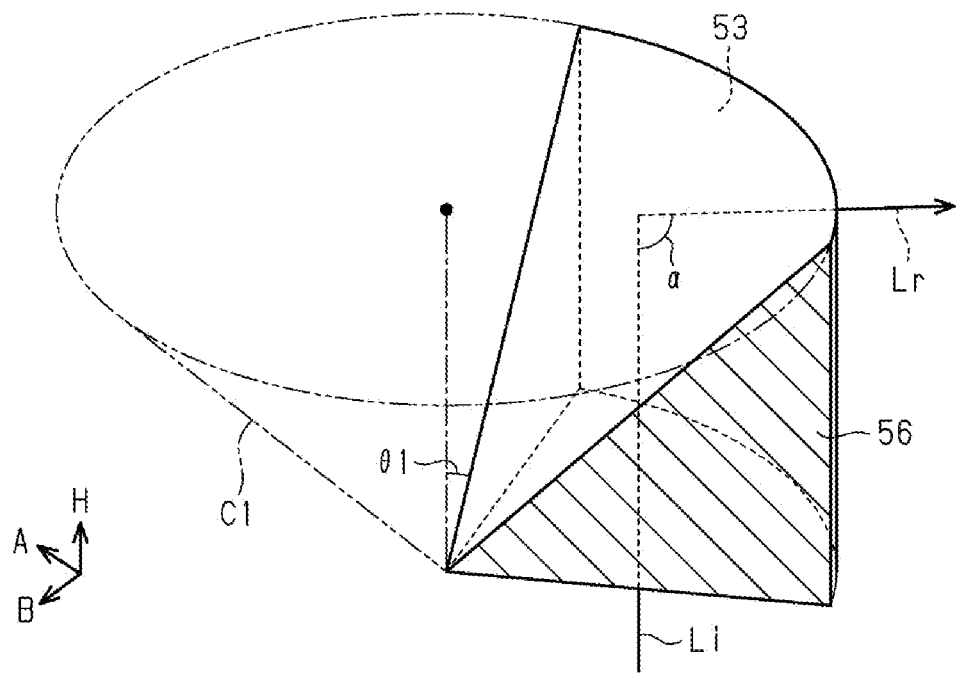
FIG. 13 is a partial perspective view illustrating a convex reflecting surface.

Next, a configuration of the convex reflecting surface 53 will be described with reference to FIGS. 13 and 14. Note that in FIGS. 13 and 14, the wavy boundary BL is omitted. As illustrated in FIG. 13, the convex reflecting surface 53 is convex in a direction (the −H direction) opposite to a traveling direction (the +H direction) of incident light, and is formed in a surface shape of at least a part of a virtual conical surface C1. The virtual conical surface C1 defining the surface shape of the convex reflecting surface 53 has an apex facing the direction (−H direction) opposite to the traveling direction (+H direction) of the incident light.

Figure 14:
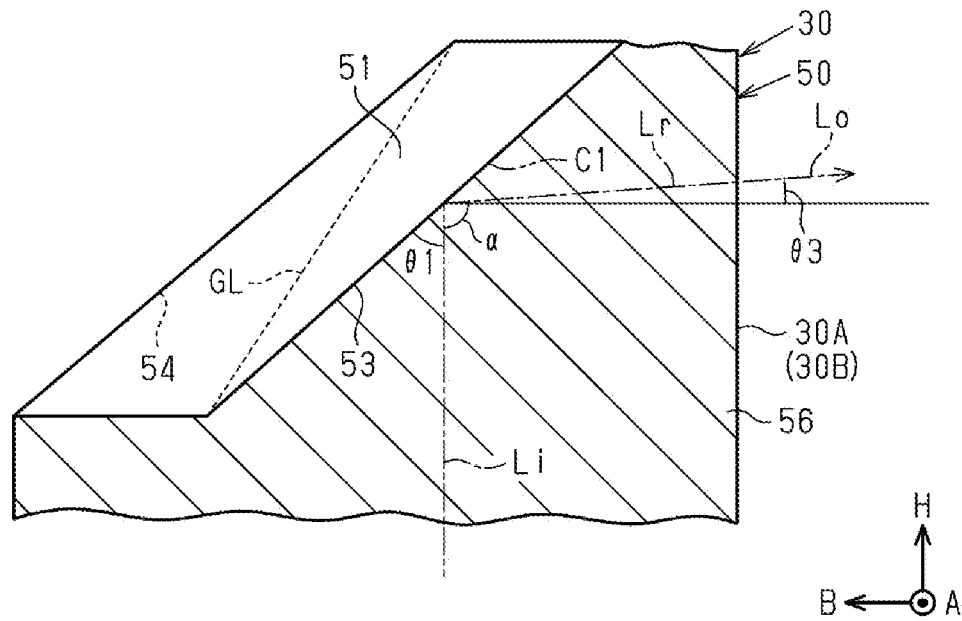
FIG. 14 is a partial side cross-sectional view illustrating a portion of the convex reflecting surface in the indicator lamp.

As illustrated in FIGS. 13 and 14, the incident light Li passes through the light guide component of the light reflecting member 50 and is reflected by the convex reflecting surface 53. An angle α formed by the incident light Li and reflected light Lr is, for example, greater than 90 degrees (α>) 90°.

The light reflecting member 50 illustrated in FIG. 14 is constituted by the light guide component that transmits light. The reflecting surface 51 is constituted by an interface between the light guide component and the atmosphere. Therefore, the convex reflecting surface 53 constituting the reflecting surface 51 is also constituted by an interface between the light guide component 56 and the atmosphere. An incident angle of incident light with respect to the convex reflecting surface 53 is greater than a critical angle. Therefore, the incident light Li formed of parallel light is totally reflected by the convex reflecting surface 53.

An angle θ1 formed by the convex reflecting surface 53 and the incident light Li is from 40 degrees to 45 degrees. Therefore, the angle α formed by the incident light Li and the reflected light Lr is a predetermined angle within a range from 90 degrees to 100 degrees. The reflected light Lr is directed obliquely upward at a predetermined angle θ3 with respect to the horizontal plane. The predetermined angle θ3 is an angle from 0 degrees to 10 degrees in the embodiment. For example, an angle from 1 degree to 5 degrees may be selected as the predetermined angle θ3. Then, the reflected light Lr transmitted through the light guide component 56 of the light reflecting member 50 is emitted as emission light Lo without being refracted so much in the directed direction at the predetermined angle θ3 from the front surface 30A or the back surface 30B. Note that as illustrated in FIG. 12, when reflected light passes through the front surface 30A or the back surface 30B, the reflected light is refracted in a light direction plane in which the light is directed.

About Configuration of Concave Reflecting Surface 54

Figure 15:
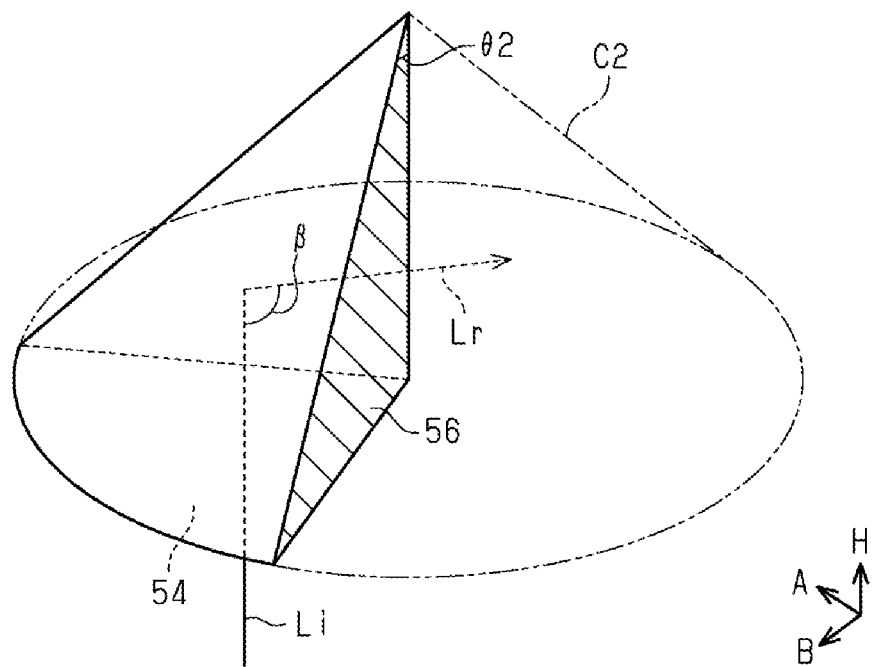
FIG. 15 is a partial perspective view illustrating a concave reflecting surface.

Next, a configuration of the concave reflecting surface 54 will be described with reference to FIGS. 15 and 16. Note that in FIGS. 15 and 16, the wavy boundary BL is omitted. As illustrated in FIG. 15, the concave reflecting surface 54 is concave in a traveling direction (the +H direction) of incident light, and is formed in a surface shape of at least a part of a virtual conical surface C2. The virtual conical surface C2 defining the surface shape of the concave reflecting surface 54 has an apex facing the traveling direction (the +H direction) of the incident light.

Figure 16:
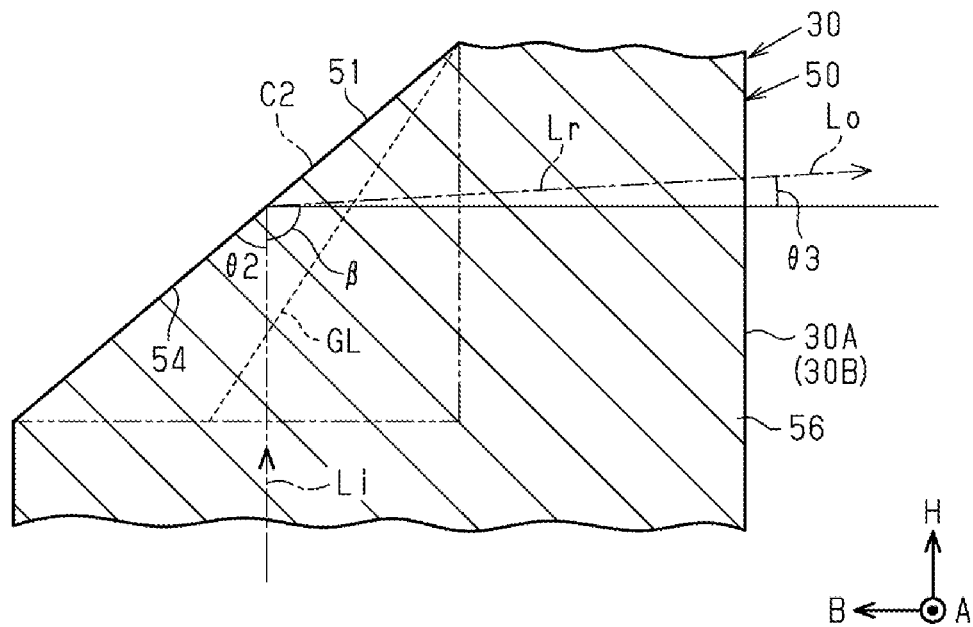
FIG. 16 is a partial side cross-sectional view illustrating a portion of the concave reflecting surface in the indicator lamp.

As illustrated in FIGS. 15 and 16, the incident light Li passes through the light guide component 56 of the light reflecting member 50 and is reflected at the concave reflecting surface 54. An angle β formed by the incident light Li and the reflected light Lr is, for example, greater than 90 degrees (β>) 90°.

The light reflecting member 50 illustrated in FIG. 16 is constituted by the light guide component 56 that transmits light. The reflecting surface 51 is constituted by an interface between the light guide component 56 and the atmosphere. Therefore, the concave reflecting surface 54 constituting the reflecting surface 51 is also constituted by an interface between the light guide component 56 and the atmosphere. An incident angle of incident light with respect to the concave reflecting surface 54 is greater than a critical angle. Therefore, the incident light Li formed of parallel light is totally reflected by the concave reflecting surface 54.

An angle θ2 formed by the concave reflecting surface 54 and the incident light Li is from 40 degrees to 45 degrees. Therefore, the reflected light Lr is directed obliquely upward at the predetermined angle θ3 with respect to the horizontal plane. Then, the reflected light Lr transmitted through the light guide component 56 of the light reflecting member 50 is emitted as the emission light Lo without being refracted so much from the front surface 30A or the back surface 30B.

As described above, the indicator lamp 30 is provided with narrow directivity, by the convex reflecting surface 53 and the concave reflecting surface 54, that is directed at the predetermined angle θ3 obliquely upward with respect to the horizontal plane in the height direction H. Further, as illustrated in FIG. 12, in the indicator lamp 30, light reflected by the convex reflecting surface 53 and the concave reflecting surface 54 is distributed in a wide range in the horizontal direction, and a light amount distribution in the horizontal direction becomes uniform.

Individual Reflecting Surface Row 52

Next, with reference to FIGS. 12 and 17 to 22, a shape of a coupling portion between the two individual reflecting surface rows 52 adjacent to each other in the second direction will be described. In the embodiment, the shape of the coupling portion between the two individual reflecting surface rows 52 suppresses variations in light amount when the front surface 30A and the back surface emit light due to a difference between near and far from the light emitter 31.

Light from the light emitter 31 is attenuated as a distance from the light emitter 31 increases. Therefore, a light emission amount of the front surface 30A of the indicator lamp 30 depends on the distance from the light emitter 31. Normally, a light amount is large at a portion close to the light emitter 31, and a light amount is small at a portion far from the light emitter 31. Further, a light amount distribution of light from the light emitter 31 changes depending on a degree of spread of the light emitted from the light emitter 31, and a light emission light amount distribution of the light emitter 31 itself. Therefore, variations in light amount distribution are likely to occur in the front surface 30A and the back surface 30B of the indicator lamp 30.

For this reason, in the embodiment, the shape of the coupling portion between the two individual reflecting surface rows 52 adjacent to each other in the second direction, that is, a shape of a boundary between the rows is changed to suppress the variations in the light amount distribution. That is, a surface shape is provided near the light emitter 31 such that a portion of the individual reflecting surface 55 having a large radius of curvature is reduced, and a surface shape is provided far from the light emitter 31 such that a portion of the individual reflecting surface 55 having a large radius of curvature is increased. Then, at a distance not close or far from the light emitter 31, a portion having a large radius of curvature of the individual reflecting surface 55 is neither reduced nor increased so much. In this way, an area of a portion having a large radius of curvature of the individual reflecting surface 55 is increased or decreased depending on a boundary shape between the individual reflecting surface rows 52.

As illustrated in FIG. 12, the two adjacent individual reflecting surface rows 52 are coupled to each other with the boundary BL indicated by a wavy curve that changes so as to wave in the second direction K. When an area of a portion having a large radius of curvature of the individual reflecting surface 55 is decreased, a light amount of reflected light in a direction of front 0 degrees is relatively decreased. When an area of a portion having a large radius of curvature of the individual reflecting surface 55 is increased, a light amount of reflected light in the direction of front 0 degrees is relatively increased. Note that when an area of a portion having a large radius of curvature of the individual reflecting surface 55 is decreased, an area of a portion having a small radius of curvature is increased. In addition, when an area of a portion having a large radius of curvature of the individual reflecting surface 55 is increased, an area of a portion having a small radius of curvature is decreased.

Figure 17:
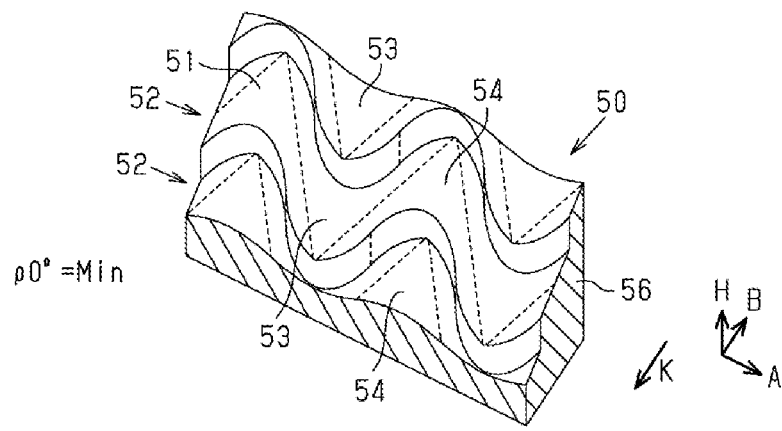
FIG. 17 is a partial perspective view illustrating the reflecting surface located at a position close to a light emitter.
Figure 18:
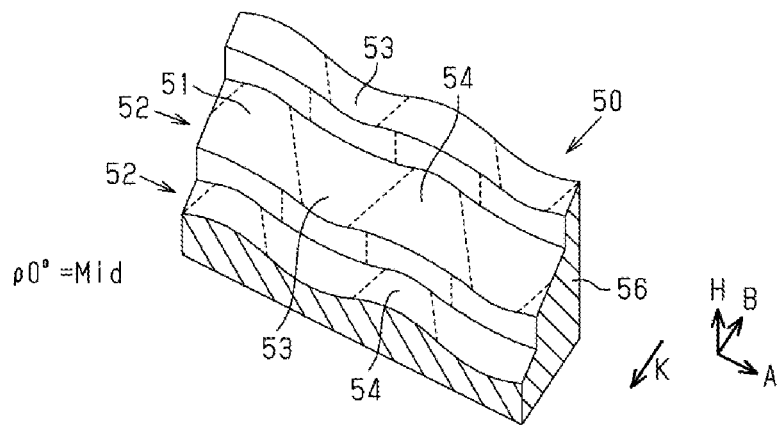
FIG. 18 is a partial perspective view illustrating the reflecting surface located at an intermediate position from the light emitter.
Figure 19:
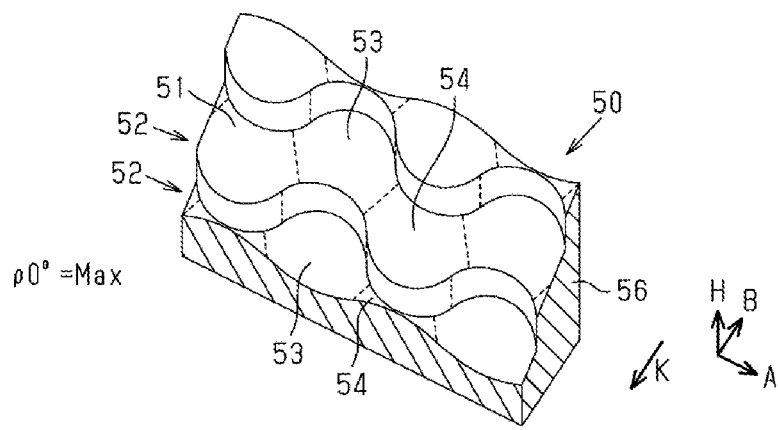
FIG. 19 is a partial perspective view illustrating the reflecting surface located at a position distant from the light emitter.
Figure 20:
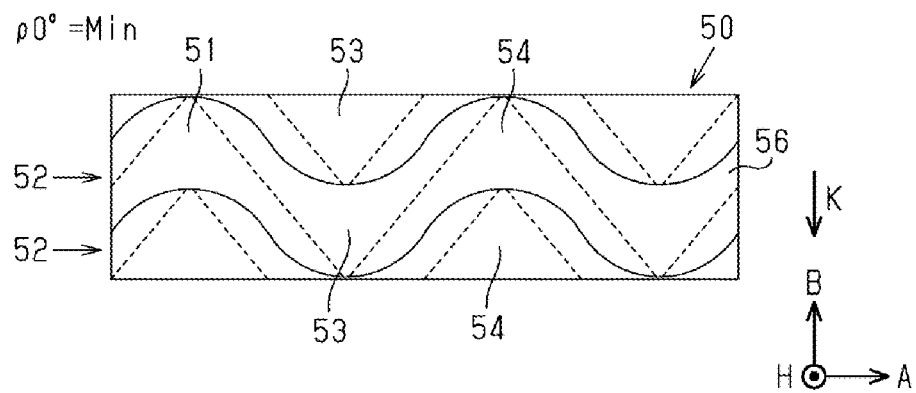
FIG. 20 is a partial plan view illustrating the reflecting surface located at a position close to the light emitter.
Figure 21:
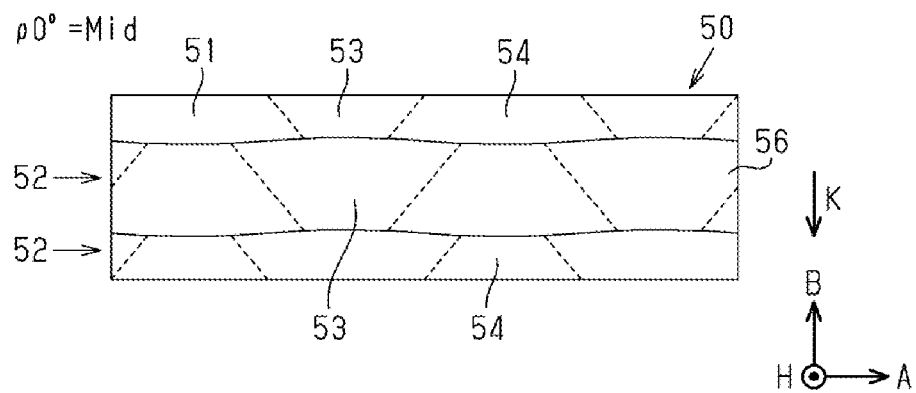
FIG. 21 is a partial plan view illustrating the reflecting surface located at an intermediate position from the light emitter.
Figure 22:
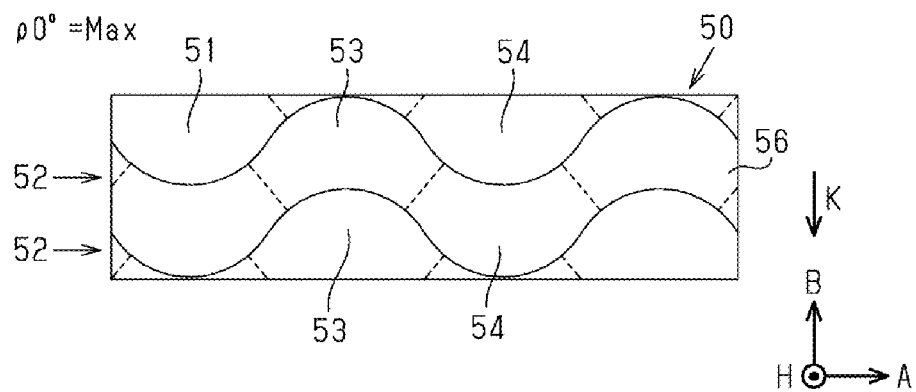
FIG. 22 is a partial plan view illustrating the reflecting surface located at a position distant from the light emitter.

Then, FIGS. 17 to 19 illustrate partial perspective views of the reflecting surface 51 under conditions of ρ0°=Min, ρ0°=Mid, and ρ0°=MAX, respectively. FIGS. 20 to 22 illustrate partial plan views of the reflecting surface 51 under the conditions of ρ0°=Min, ρ0°=Mid, and ρ0°=Max, respectively. Here, ρ0° represents a light amount at a front side) (0°. That is, the light amount indicates, when a direction orthogonal to the front surface 30A or the back surface 30B (front direction) is defined as 0°, a light amount of light directed in the direction of 0°. As described above, the indicator lamp 30 of the embodiment has the light directivity in the direction inclined obliquely upward at the predetermined angle θ3 with respect to the horizontal plane. While the light directivity is maintained, a light amount of reflected light for each individual reflecting surface 55 is adjusted by the shape of the boundary BL.

Here, when the virtual conical surface C that defines the surface shape of the individual reflecting surface 55 is assumed, a narrowing side of the individual reflecting surface 55 is defined as an apex side, and a widening side is defined as a bottom surface side. In this case, in FIGS. 17 to 22, at a coupling portion between the two individual reflecting surface rows 52 adjacent to each other in the second direction K, the apex side of an individual reflecting surface constituting the individual reflecting surface row 52 on one side and the bottom surface side of the individual reflecting surface 55 constituting the individual reflecting surface row 52 on another side are arranged in correspondence.

As illustrated in FIGS. 17 and 20, when ρ0°=Min, of the two individual reflecting surfaces 55 corresponding to the second direction K, the apex side of the individual reflecting surface 55 on the one side is configured to protrude in a direction of the bottom surface side of the individual reflecting surface 55 on the other side.

As illustrated in FIGS. 19 and 22, when ρ0°=Max, of the two individual reflecting surfaces 55 corresponding to the second direction K, the bottom surface side of the individual reflecting surface 55 on the one side is configured to protrude in a direction of the apex side of the individual reflecting surface 55 on the other side.

As illustrated in FIGS. 18 and 21, when ρ0°=Mid, a configuration is adopted in which the apex side of the individual reflecting surface 55 on the one side of two corresponding to the second direction K does not protrude in the direction of the bottom side of the individual reflecting surface 55 on the other side, and the bottom surface side of the individual reflecting surface 55 on the one side does not protrude in the direction of the apex side of the individual reflecting surface 55 on the other side. That is, the boundary BL between the two adjacent individual reflecting surface rows 52 is linear.

In the case of ρ0°=Min illustrated in FIGS. 17 and 20, an area of the individual reflecting surface 55 is decreased, and a region of the individual reflecting surface 55 having a large radius of curvature is relatively decreased. On the other hand, in the case of ρ0°=Max illustrated in FIGS. 19 and 22, an area of the individual reflecting surface 55 is increased, and a region of the individual reflecting surface 55 having a large radius of curvature is relatively increased. Then, in the case of ρ0°=Mid illustrated in FIGS. 18 and 21, an area of the individual reflecting surface 55 is intermediate between the area in the case of ρ0°=Min and the area in the case of ρ0°=Max, and a width of a region having a large radius of curvature of the individual reflecting surface 55 is also intermediate.

When reflected light at one individual reflecting surface 55 is regarded as one light emitting point, a light emitting point at the front surface 30A or the back surface 30B of the indicator lamp 30 has a small light amount when ρ0°=Min, has a large light amount when ρ0°=Max, and has an intermediate light amount when ρ0°=Mid.

Figure 23:
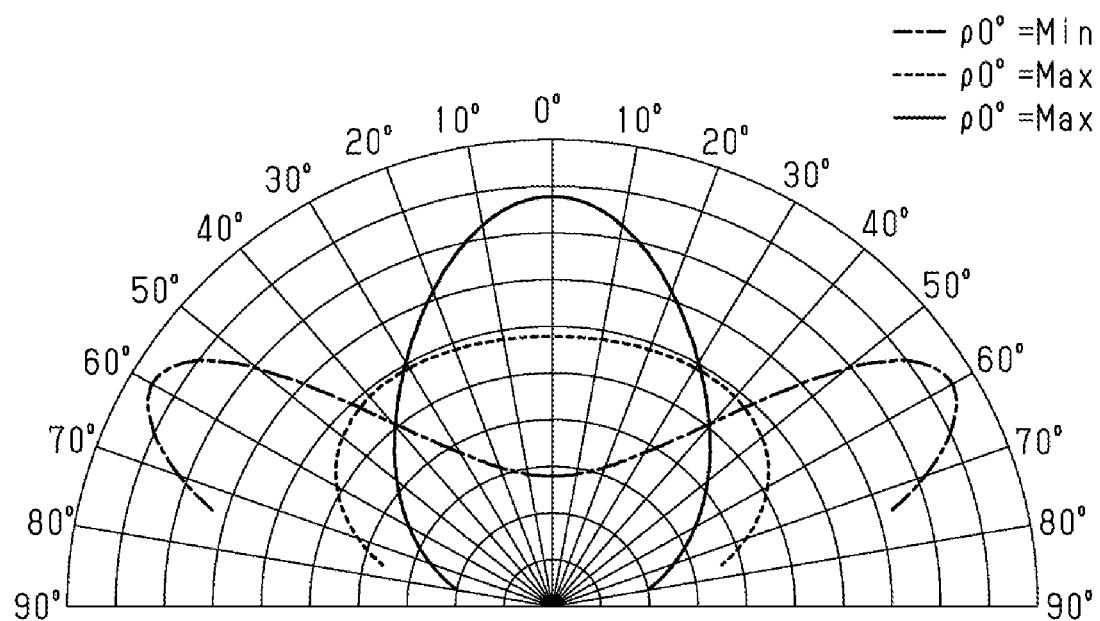
FIG. 23 is a graph showing reflected light distribution characteristics of three types of unit reflecting surfaces.

FIG. 23 is a graph showing, when one individual reflecting surface 55 is regarded as a light emitting point, light directivity and a light amount (light intensity) of the light emitting point. In this graph, a direction orthogonal to a light emitting surface to which the light emitting point belongs (a direction toward a front side of the light emitting point) is defined as 0°, and the light directivity is shown in a range of 90° to each of left and right sides. In addition, a position of the light emitting point is defined as an origin "0", and a light amount (light intensity) is indicated by a distance from the origin. Note that the graph of FIG. 23 shows the light directivity of the light emitting point in a light directivity plane at the predetermined angle θ3 in which the emitted light Lo illustrated in FIGS. 14 and 16 is directed.

In the graph of FIG. 23, in the case of ρ0°=Min indicated by an alternate long and short dash line, a light amount of light toward a front side) (0° of the light emitting point is large, and reflected light has directivity toward the front side. In addition, in the case of ρ0°=Max indicated by a solid line in this graph, a light amount of light toward the front side) (0° of the light emitting point is small, but a light amount directed in a direction of 60° is large. In other words, reflected light has directivity directed in the direction of 60°. Further, in the case of ρ0°=Mid indicated by a broken line in this graph, light amounts are evenly distributed in all directions from the light emitting point. There is no particular directivity of reflected light in the light directivity plane at the predetermined angle θ 3.

Then, as illustrated in FIGS. 3 and 5, the indicator lamp 30 includes the three light emitters 31 at three different positions in the longitudinal direction A below the optical path conversion member 40. The individual reflecting surface 55 of ρ0°=Min is arranged in a region close to the light emitter 31 in the longitudinal direction A at the reflecting surface 51. Further, the individual reflecting surface 55 of ρ0°=Max is arranged in a region far from the light emitter 31 in the longitudinal direction A at the reflecting surface 51. The individual reflecting surface 55 of ρ0°=Mid is arranged in a region having an intermediate distance from the light emitter 31 in the longitudinal direction A at the reflecting surface 51. Note that although the three types of individual reflecting surfaces 55 with ρ0°=Min, Mid, and Max are illustrated in FIGS. 17 to 22, the individual reflecting surface 55 of a type with a different value of ρ0° may be arranged among the three types of individual reflecting surfaces 55.

As described above, the coupling portion between the two individual reflecting surface rows 52 adjacent to each other in the second direction K includes both the portion (first portion) of the individual reflecting surface 55 of ρ0°=Min and the portion (second portion) of the individual reflecting surface 55 of ρ0°=Max. The first portion is a portion configured such that the apex side of the individual reflecting surface 55 on the one side protrudes in the direction of the bottom surface side of the individual reflecting surface 55 on the other side. The second portion is a portion configured such that the bottom surface side of the individual reflecting surface 55 on the one side protrudes in the direction of the apex side of the individual reflecting surface 55 on the other side. In the embodiment, the coupling portion between the two individual reflecting surface rows 52 adjacent to each other in the second direction K is the first portion (the portion of ρ0°=Min) at a position close to the light emitter 31 in the first direction A, and is the second portion (the portion of ρ0°=Max) at a position far from the light emitter 31.

Figure 24:
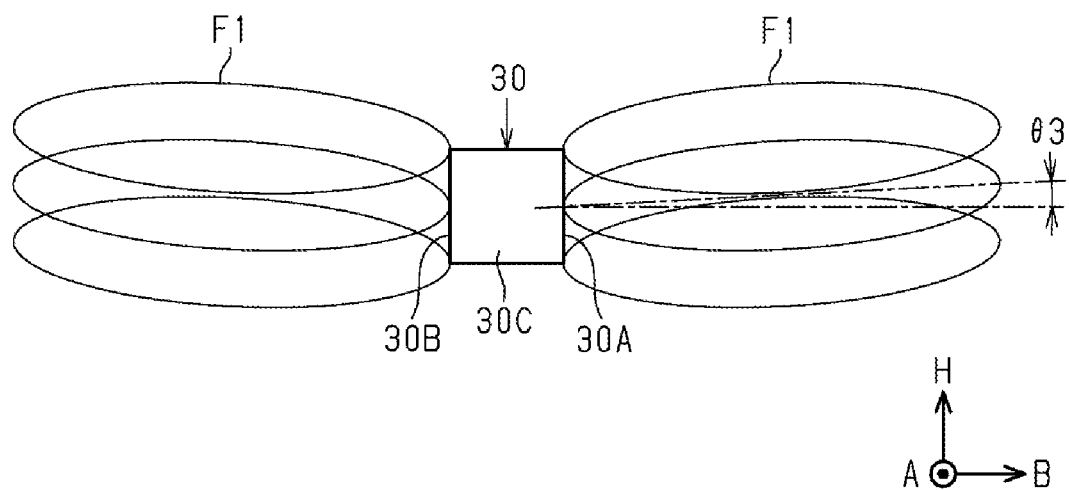
FIG. 24 is a light amount distribution characteristic diagram illustrating light directivity in a front-rear direction of the indicator lamp.
Figure 25:
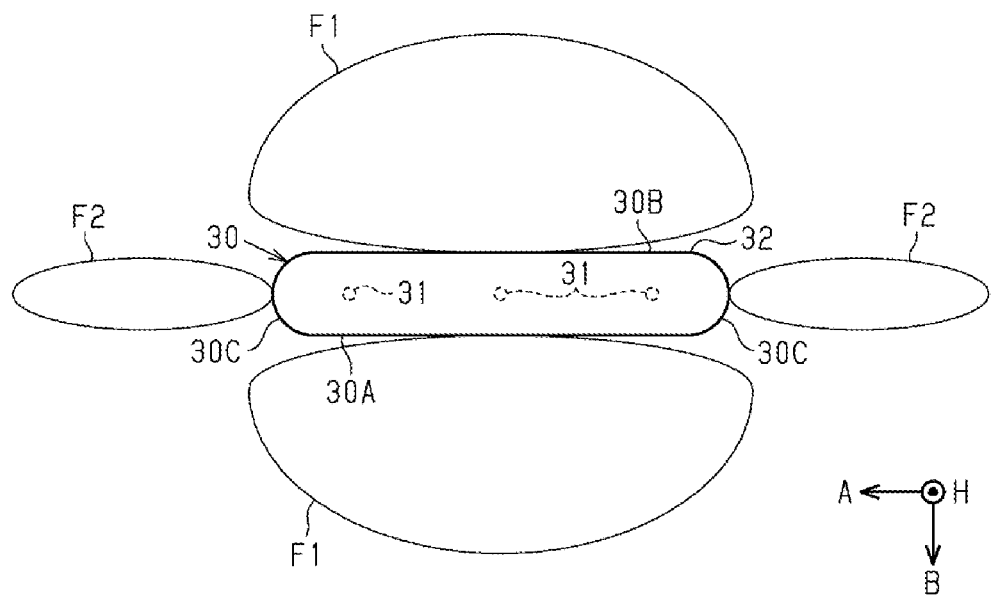
FIG. 25 is a light amount distribution characteristic diagram illustrating light directivity in all directions of the indicator lamp.

FIGS. 24 and 25 show light emission characteristics of the indicator lamp 30 of the embodiment in which the individual reflecting surfaces 55 are arranged in the above-described layout. FIG. 24 shows light emission characteristics of the front surface 30A and the back surface 30B when the indicator lamp 30 is viewed from the A direction. FIG. 25 shows directional characteristics of light emitted from the side peripheral surface 32 when the indicator lamp 30 is viewed from the −H direction. FIG. 24 shows a light emission distribution curve F1 at some (for example, three) of a large number of light emitting points arranged in the H direction. The light emission distribution curve shows directivity and light amount (light intensity) of light at the light emitting point. As indicated by the light emission distribution curve F1 in FIG. 24, the indicator lamp 30 of the embodiment has directivity of light in the direction inclined obliquely upward at the angle θ3 with respect to the horizontal plane. Therefore, light of a sufficient light amount is emitted from the front surface 30A and the back surface 30B of the indicator lamp 30 in the directed direction at the angle θ3.

In FIG. 25, the light emission distribution curve F1 according to a plurality of representative light emitting points is shows for each of the front surface 30A and the back surface 30B of the indicator lamp 30, and a light emission distribution curve F2 of one light emitting point is shown for the side end surface 30C. As indicated by the light emission distribution curve F1 shown in FIG. 25, light having a spread in a light directivity plane at the angle θ3 is emitted from each of the front surface 30A and the back surface 30B. Additionally, as indicated by the light emission distribution curve F2 shown in FIG. 25, light having high directivity in the longitudinal direction A, for example, light close to parallel light is emitted from the side end surface 30C. Note that light indicated by the light emission distribution curve F2 is directed obliquely upward at the angle θ3 with respect to the horizontal plane, similarly to the light emission distribution curve F1.

Effects of Embodiment

Next, description is made of effects of the printing apparatus 11 of the embodiment.

During printing, the printing head 25 performs printing on the medium M while the carriage 24 moves in the width direction X under the control of the control unit 100. The medium M after printing is discharged from the discharge port 18. When an abnormality or the like occurs in the printing apparatus 11 during a printing operation or the like, the control unit 100 causes the indicator lamp 30 to emit light. The indicator lamp 30 may emit light in a plurality of colors. The light emission of the indicator lamp 30 may be blinking. The indicator lamp 30 notifies a user of the occurrence of abnormality or presence of notification information by the light emission.

The user performs working or monitoring around the printing apparatus 11. Therefore, it is unknown from which direction the user looks at the indicator lamp 30 with respect to the printing apparatus 11.

The indicator lamp 30 of the embodiment has narrow directivity in an obliquely upward direction at the angle θ3 with respect to the horizontal plane in the vertical direction Z. That is, the indicator lamp 30 arranged at the upper surface of the housing 14 has light directivity toward an eye height of the user performing working or monitoring at a position separated from the printing apparatus 11 by a predetermined distance. Further, the indicator lamp 30 has wide directivity in the horizontal direction and has a uniform light amount distribution in the horizontal direction. Therefore, regardless of a direction in which the user is positioned around the printing apparatus 11, it is easy for the user to visually recognize the indicator lamp 30.

In addition, the indicator lamp 30 of the embodiment uniformly emits light without variations in light amount due to a difference in position in the A direction from the light emitter 31 at the front surface 30A and the back surface 30B. Therefore, when looking at the front surface 30A or the back surface 30B of the indicator lamp 30, the user can immediately notice light emission of the indicator lamp 30. Therefore, it is difficult to overlook the light emission of the indicator lamp 30.

In addition, when the user is on a lateral side of the printing apparatus 11, the user is to look at the side end surface 30C of the indicator lamp 30. The side end surface 30C of the indicator lamp 30 has a smaller light emitting area as compared with the front surface 30A or the back surface 30B. Light close to parallel light parallel to the X direction obliquely upward at the angle θ3 with respect to the horizontal plane is emitted from the side end surface 30C. Therefore, when the user looks at the indicator lamp 30 from the X direction, a light emission amount at an angle at which the user looks at is large despite a small light emission area of the side end surface 30C. Therefore, even when the user is to look at the small side end surface 30C of the indicator lamp 30, light emission of the indicator lamp 30 is easily visible.

On the other hand, when the user performs working or an operation on the printing apparatus 11, the user is located near the indicator lamp 30. However, a position of the user's eye is out of a directed direction of light narrow in the vertical direction Z of the indicator lamp 30. For example, the position of the user's eye comes off upward from the directed direction of the light of the indicator lamp 30. Therefore, the user can perform working or an operation on the printing apparatus 11 without feeling that the light of the indicator lamp 30 is too bright.

Therefore, according to the above embodiment, the following effects can be obtained.

(1) The printing apparatus 11 as an example of an electronic device includes the indicator lamp 30 that emits light in a predetermined color when an abnormality occurs. The indicator lamp 30 includes the light source 33 that emits light formed of parallel light, and the light reflecting member 50 on which light emitted from the light source 33 is incident and that reflects the incident light. The light reflecting member 50 includes the reflecting surface 51 at which light is reflected. The reflecting surface 51 includes the plurality of individual reflecting surfaces 55 formed in the surface shape of at least a part of a conical surface C1 or C2 having the axis forming the predetermined angle with respect to the traveling direction of the incident light. The plurality of individual reflecting surfaces 55 are arranged side by side in the first direction A intersecting the traveling direction of the incident light. According to this configuration, in the indicator lamp 30, light directivity can be provided in the traveling direction of the incident light that is emitted from the light source 33 and is incident on the reflecting surface 51, and in a direction intersecting the first direction A, and a light amount distribution can be made uniform. Therefore, the indicator lamp 30 easily ensures the light directivity and the uniformity of the light amount distribution in a directed range. For example, it is easy for a user to visually recognize light emission of the indicator lamp 30 from a position away from the printing apparatus 11, and the light emission of the indicator lamp 30 is not too bright for the user at a position close to the printing apparatus 11. In addition, the indicator lamp 30 having such characteristics can be achieved in a small size or can be achieved in a shape such as a rectangular parallelepiped or a long cylinder.

(2) The light source 33 includes the light emitter 31, and the optical path conversion member 40 that converts light from the light emitter 31 into a parallel light flux and that causes the parallel light flux to be incident on the light reflecting member 50. According to this configuration, parallel light can be incident on the reflecting surface 51 of the light reflecting member 50. For example, parallel light forming a predetermined angle with respect to the axis of the conical surface C1 or C2 defining the shape of the individual reflecting surfaces 55 constituting the reflecting surface 51 can be incident on the plurality of individual reflecting surfaces 55. Therefore, it is easy to ensure the light directivity and the uniformity of the light amount distribution of the indicator lamp 30.

(3) The conical surfaces C1 and C2 each have the axis parallel to the traveling direction of the incident light. According to this configuration, even when the conical surfaces C1 and C2 at least partially formed by the surface shape of the plurality of individual reflecting surfaces 55 have the same shape, light can be emitted so as to be directed at substantially the same angle with respect to the horizontal plane regardless of position in the longitudinal direction A of the indicator lamp 30.

(4) The individual reflecting surface 55 includes the convex reflecting surface 53 that is convex in a direction opposite to the traveling direction of the incident light and that is formed in the surface shape of at least a part of the conical surface C1, and the concave reflecting surface 54 that is concave in the traveling direction of the incident light and that is formed in the surface shape of at least a part of the conical surface C2, and the convex reflecting surface 53 and the concave reflecting surface 54 are arranged side by side in the first direction A. According to this configuration, the plurality of individual reflecting surfaces 55 can be densely arranged in the first direction A. For example, by arranging the convex reflecting surface 53 and the concave reflecting surface 54 adjacent to each other, it is possible to increase a rate of parallel light incident on the reflecting surface 51 that can be reflected in a directed direction. Therefore, it is easy to ensure the light directivity and high light emission intensity in the directed direction.

(5) The convex reflecting surface 53 is formed in the surface shape of at least a part of the conical surface C1 in which the apex faces the direction opposite to the traveling direction of the incident light. The concave reflecting surface 54 is formed in the surface shape of at least a part of the conical surface C1 or C2 in which the apex faces the traveling direction of the incident light. According to this configuration, since the convex reflecting surface 53 and the concave reflecting surface 54 have the surface shapes in which the directions of the respective apexes of the virtual conical surfaces C1 and C2 at least partially including the surface shapes of the convex reflecting surface 53 and the concave reflecting surface 54 are opposite to each other, the convex reflecting surface 53 and the concave reflecting surface 54 can be densely arranged in the first direction A. It is possible to increase the rate of the parallel light incident on the reflecting surface 51 that can be reflected in the directed direction.

(6) The convex reflecting surface 53 and the concave reflecting surface 54 are formed in the surface shapes of at least a part of the conical surfaces C1 and C2, respectively. The convex reflecting surface 53 and the concave reflecting surface 54 are arranged side by side in the first direction A in the state where the generating lines GL are coupled to each other. According to this configuration, the convex reflecting surface 53 and the concave reflecting surface 54 can be densely arranged in the first direction A. For example, by arranging the convex reflecting surface 53 and the concave reflecting surface 54 adjacent to each other, it is possible to increase the rate of parallel light incident on the reflecting surface 51 that can be reflected in a directed direction. Therefore, it is easy to ensure the light directivity and the high light emission intensity.

(7) In the reflecting surface 51 of the light reflecting member 50, the convex reflecting surface 53 and the concave reflecting surface 54 are arranged side by side in the first direction A in the state in which the generating lines GL are coupled to each other to form the individual reflecting surface row 52, and a plurality of the individual reflecting surface rows 52 are arranged in the second direction K intersecting the first direction A. According to this configuration, since the plurality of individual reflecting surface rows 52 in which the convex reflecting surface 53 and the concave reflecting surface 54 are arranged side by side in the first direction A in the state where the generating lines GL are coupled to each other are arranged in the second direction K intersecting the first direction A, it is possible to expand a light emitting region of the indicator lamp 30 also in the second direction K.

(8) The light reflecting member 50 is made of a transparent resin material. According to this configuration, since the light reflecting member 50 is made of a transparent resin material, attenuation of light when the light passes through the light reflecting member 50 can be suppressed. Therefore, the indicator lamp 30 can emit light at high emission intensity corresponding to light emission intensity of the light source 33.

(9) When the virtual conical surface C1 or C2 that is virtual and that defines the surface shape of the individual reflecting surface 55 is assumed, the narrowing side of the individual reflecting surface 55 is defined as the apex side, and the widening side of the individual reflecting surface 55 is defined as the bottom surface side. In the coupling portion between the two individual reflecting surface rows 52 adjacent to each other in the second direction K, the apex side of the individual reflecting surface 55 constituting the individual reflecting surface row 52 on the one side and the bottom surface side of the individual reflecting surface 55 constituting the individual reflecting surface row 52 on the other side are arranged in correspondence. The bottom surface side of the individual reflecting surface 55 on the one side protrudes in a direction of the apex side of the individual reflecting surface 55 on the other side. According to this configuration, the individual reflecting surface 55 relatively increases a light amount of light, of reflected light, emitted to a front side, and relatively decreases a light amount of light emitted in directions other than the front side. Therefore, it is possible to contribute to uniformity of a light emission distribution of the indicator lamp 30.

(10) When the virtual conical surface C1 or C2 that is virtual and that defines the surface shape of the individual reflecting surface 55 is assumed, the narrowing side of the individual reflecting surface 55 is defined as the apex side, and the widening side of the individual reflecting surface 55 is defined as the bottom surface side. In the coupling portion between the two individual reflecting surface rows 52 adjacent to each other in the second direction K, the apex side of the individual reflecting surface 55 constituting the individual reflecting surface row 52 on the one side and the bottom surface side of the individual reflecting surface 55 constituting the individual reflecting surface row 52 on the other side are arranged in correspondence. The apex side of the individual reflecting surface 55 on the one side protrudes in the direction of the bottom surface side of the individual reflecting surface 55 on the other side. According to this configuration, the individual reflecting surface 55 relatively decreases a light amount of light, of reflected light, emitted to the front side, and relatively increases a light amount of light emitted in directions other than the front side. Therefore, it is possible to contribute to uniformity of a light emission distribution of the indicator lamp 30.

(11) The coupling portion between the two individual reflecting surface rows 52 adjacent to each other in the second direction K includes both the portion in which the bottom surface side of the individual reflecting surface 55 on the one side protrudes in the direction of the apex side of the individual reflecting surface 55 on the other side, and the portion in which the apex side of the individual reflecting surface 55 on the one side protrudes in the direction of the bottom surface side of the individual reflecting surface 55 on the other side. According to this configuration, both of the two types of individual reflecting surfaces 55 having different reflection characteristics are provided. That is, the individual reflecting surface 55 on the one side relatively decreases a light amount of light, of reflected light, emitted to the front side, and relatively increases a light amount of light emitted in the directions other than the front side. The individual reflecting surface 55 on the other side relatively increases a light amount of light, of reflected light, emitted to the front side, and relatively decreases a light amount of light emitted in the directions other than the front side. Therefore, the light emission distribution of the indicator lamp 30 can be made more uniform.

(12) The light reflecting member 50 is constituted by the light guide component 56 that transmits light, the reflecting surface 51 is constituted by the interface between the light guide component 56 and the atmosphere, and the incident angle of the incident light with respect to the reflecting surface 51 is greater than the critical angle. According to this configuration, since the incident light is reflected by the reflecting surface 51, it is possible to ensure high light emission intensity in a directed direction of the indicator lamp 30.

(13) The reflecting surface 51 of the light reflecting member 50 is processed to reflect light. According to this configuration, since a rate of the incident light that is reflected by the reflecting surface 51 is increased, it is possible to ensure the high light emission intensity of the directed direction of the indicator lamp 30.

(14) The angle formed by the reflecting surface 51 and incident light is from 40 degrees to 45 degrees. According to this configuration, the reflecting surface 51 can reflect light in a direction forming an angle within a range from 90 degrees to 100 degrees with respect to the incident light. For example, when the incident light is incident upward in the vertical direction, the reflecting surface 51 can reflect light directed obliquely upward by a predetermined angle within a range from 0 to 10 degrees with respect to the horizontal. For example, when the indicator lamp 30 is arranged at the printing apparatus 11, it is possible to emit light directed to the height of a user's eyes from the indicator lamp 30. Therefore, the user can easily notice the light emission of the indicator lamp 30.

(15) The indicator lamp 30 emits light in a plurality of colors. According to this configuration, since light is emitted in a plurality of colors, various information can be notified by a combination of light emission colors in addition to a light emission mode.

(16) The light formed of parallel light emitted from the light source 33 is incident on the light reflecting member 50, and the light reflecting member 50 reflects the incident light. The light reflecting member 50 includes the reflecting surface 51 at which light is reflected. At the reflecting surface 51, the individual reflecting surfaces 55 formed in the surface shape of at least a part of the conical surface C1 or C2 having the axis forming the predetermined angle with respect to the traveling direction of the incident light are arranged side by side in the first direction A intersecting the traveling direction of the incident light. According to this configuration, it is easy to ensure the light directivity of the indicator lamp 30 and the uniformity of the light amount distribution in the directed range.

(17) The indicator lamp 30 includes the light source 33 and the light reflecting member 50. According to this configuration, it is easy to ensure the light directivity of the indicator lamp 30 and the uniformity of the light amount distribution in the directed range.

The above embodiments can also be modified into forms such as the following modification examples. Further, a further modification example may be made by appropriately combining the above embodiments and modification examples to be illustrated hereinafter, or a further modification example may be made by appropriately combining the modification examples to be illustrated hereinafter.

Figure 26:
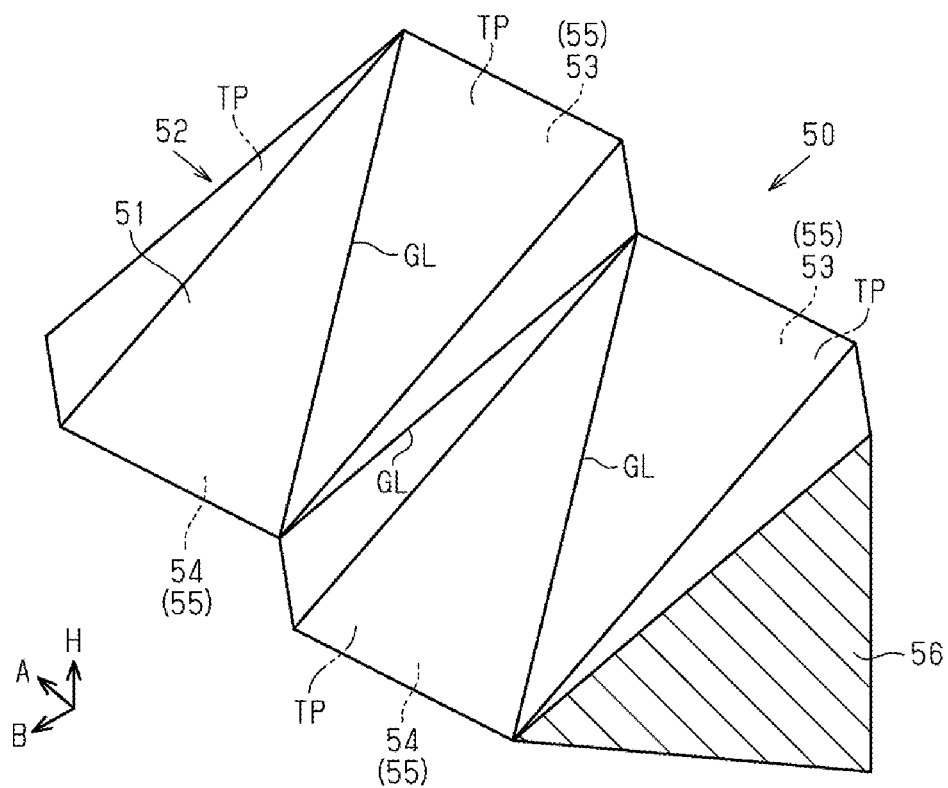
FIG. 26 is a partial perspective view illustrating a reflecting surface in a modification example.

In the embodiment, the individual reflecting surface 55 is not limited to be configured to have, as the surface shape, the shape of at least a part of the conical surface C1 or C2 having the axis forming the predetermined angle with respect to the traveling direction of the incident light. For example, a configuration may be adopted in which a shape of at least a part of a polygonal pyramid surface having an axis forming a predetermined angle with respect to the traveling direction of the incident light is the surface shape. For example, as illustrated in FIG. 26, a triangular pyramid surface may be adopted as a polygonal pyramid surface TP, and the individual reflecting surface 55 may have at least a part of the polygonal pyramid surface TP as the surface shape. In the example illustrated in FIG. 26, the convex reflecting surface 53 and the concave reflecting surface 54 are alternately arranged in the first direction A, as the individual reflecting surfaces 55 having the shape of a part of the polygonal pyramid surface TP as the surface shape. Then, the reflecting surface 51 is constituted by arranging a plurality of the individual reflecting surface rows 52 illustrated in FIG. 26 in the second direction K. As described above, the conical surfaces defining the surface shapes of the individual reflecting surface 55, the convex reflecting surface 53, and the concave reflecting surface 54 in FIGS. 10 to 22 may be replaced with the polygonal pyramid surfaces TP to form the individual reflecting surface rows 52 and the reflecting surface 51. Note that the polygonal pyramid surface TP may have an axis parallel to the traveling direction of the incident light.

In a modification example illustrated in FIG. 26, the reflecting surface 51 may be constituted by combining the individual reflecting surfaces 55 each having a part of the polygonal pyramid surface TP as a surface shape, where the polygonal pyramid surfaces TPs are different from each other in the number of corners.

The reflecting surface 51 may be constituted by a combination of the individual reflecting surface 55 having a part of the conical surface C1 or C2 of the embodiment as the surface shape, and the individual reflecting surface 55 having a part of the polygonal pyramid surface TP illustrated in FIG. 26 as the surface shape.

The convex reflecting surface 53 and the concave reflecting surface 54 are not limited to be arranged such that the generating lines GL are coupled to each other. The convex reflecting surface 53 and the concave reflecting surface 54 may be arranged in a state in which the respective generating lines GL are separated from each other.

The axis of the virtual conical surface C1, C2, or polygonal pyramid surface defining the surface shape of the individual reflecting surface 55 may be slightly off from parallel to the incident light Li. It is sufficient that the incident light Li is in a direction along the axis of the virtual conical surface C1, C2, or polygonal pyramid surface. Even when the axis of the virtual conical surface C1, C2, or polygonal pyramid surface and the incident light Li are off from each other, for example, in a range equal to or less than 10°, there is no problem as long as desired light directivity of the indicator lamp 30 is obtained.

Furthermore, the predetermined angle formed by the axis of the virtual conical surface C1, C2, or polygonal pyramid surface defining the surface shape of the individual reflecting surface 55 with respect to the traveling direction of the incident light may be, for example, an angle exceeding 10°. In addition, the predetermined angle formed by the axis of the virtual conical surface C1, C2, or the polygonal pyramid surface defining the surface shape of the individual reflecting surface 55 with respect to the traveling direction of the incident light may be changed according to a position of the individual reflecting surface 55 with respect to the light emitter 31.

The axis of the virtual conical surface C1, C2, or polygonal pyramid surface may be inclined with respect to the traveling direction of the incident light, or an angle of the generating line GL may be changed depending on a direction of emitted light. According to this configuration, it is possible to adjust a direction of the emitted light in the vertical direction to a desired direction.

The individual reflecting surface 55 is not limited to have a part of the conical surface C or the polygonal pyramid surface TP as the surface shape. For example, the individual reflecting surface 55 may have an entirety (entire circumference) of the conical surface C or the polygonal pyramid surface TP as a reflecting surface. In addition, the individual reflecting surface 55 may have, as the surface shape, an entire circumference of a portion of an entire circumference of the conical surface C or the polygonal pyramid surface TP excluding an entire circumference on the apex side, may have, as the surface shape, an entire circumference of a portion excluding an entire circumference on the bottom surface side, or may have, as the surface shape, an entire circumference of a portion excluding both the entire circumference on the apex side and the entire circumference on the bottom surface side. In a configuration in which the surface shape of the individual reflecting surface 55 is the entirety of the conical surface C or the polygonal pyramid surface TP or the entire circumference of a portion, for example, the virtual conical surface C or polygonal pyramid surface TP is arranged such that the apex thereof faces downward. Then, a parallel light flux parallel to the H direction is made incident on the individual reflecting surface 55 having the entirety of the virtual conical surface C or polygonal pyramid surface TP or the entire circumference of a portion as the surface shape. In this configuration, light reflected by one individual reflecting surface 55 is emitted from both the front surface 30A and the back surface 30B of the indicator lamp 30.

Instead of the configuration in which the individual reflecting surfaces 55 are arranged side by side in the A direction to form the individual reflecting surface row 52, the individual reflecting surfaces 55 may be arranged in a zigzag manner along the A direction.

The indicator lamp 30 is not limited to the configuration in which the two components of the optical path conversion member 40 and the light reflecting member 50 are bonded to each other, and may be configured by integrally molding the optical path conversion member 40 and the light reflecting member 50.

The indicator lamp 30 is not limited to the configuration in which each of the optical path conversion member 40 and the light reflecting member 50 is formed as one member with respect to the plurality of light emitter 31, and may be configured such that each of the optical path conversion member 40 and the light reflecting member 50 is formed as a member with respect to each of the plurality of light emitter 31.

The indicator lamp 30 may be configured without the optical path conversion member 40. For example, the light emitter 31 capable of emitting parallel light may be used.

Although the combination of the adjacent individual reflecting surfaces 55 in the individual reflecting surface row 52 is the combination of the convex reflecting surface 53 and the concave reflecting surface 54, a combination of the convex reflecting surface 53 and the convex reflecting surface 53, or a combination of the concave reflecting surface 54 and the concave reflecting surface 54 may be used. In short, it is sufficient to array the individual reflecting surfaces 55 having a part of the conical surface C as the surface shape. In this case, the generating lines GL of the adjacent individual reflecting surfaces 55 may be coupled to each other or need not be coupled to each other.

The shape of the coupling portion between the two individual reflecting surface rows 52 adjacent to each other in the second direction at the reflecting surface 51 is not limited to the configuration in which the individual reflecting surface 55 of $\rho 0°$=Min is arranged in a region close to the light emitter 31 in the longitudinal direction A at the reflecting surface 51, and the individual reflecting surface 55 of $\rho 0°$=Max is arranged in a region far from the light emitter 31 in the longitudinal direction A at the reflecting surface 51. For example, in order to make a light amount distribution from the indicator lamp 30 desirable, the arrangement of the individual reflecting surface 55 of $\rho 0°$=Min and the individual reflecting surface 55 of $\rho 0°$=Max may be determined in correspondence with a light emission light amount distribution of the light emitter 31. Further, only the individual reflecting surface 55 of $\rho 0°$=Min may also be used, only the individual reflecting surface 55 of $\rho 0°$=Max may also be used, or only the individual reflecting surface 55 of $\rho 0°$=Mid may also be used.

The shape of the indicator lamp 30 may be changed as appropriate. For example, the indicator lamp 30 may have a cylindrical shape. That is, a shape that does not have anisotropy in plan view may be used. For example, a tubular shape being, in plan view, a regular tetragon, a regular triangle, a regular pentagon, a regular hexagon, a regular octagon, or a regular N-sided polygon (where N is a natural number satisfying N>8) may be used.

The printing apparatus 11 is not limited to an ink jet printing apparatus. The printing apparatus 11 may be a laser printing apparatus (laser printer), a dot impact printing apparatus (dot impact printer), a thermal printing apparatus, or the like.

The printing apparatus 11 is not limited to a large format printer configured to be able to perform printing on the medium M of a large size, and may be a printer for office or personal use configured to be able to perform printing on the medium M of a relatively small size that has a maximum size of A4, A3, or the like. Further, the printing apparatus 11 may be a textile printing device. In addition, for the textile printing device, an ink jet printing method may be adopted.

The electronic device is not limited to the printing apparatus 11, and may be a scanner (image reading apparatus), a projector, or the like. Furthermore, a video apparatus such as a television, an audio apparatus, an electronic cooking apparatus such as a refrigerator or a microwave oven, or an air conditioner may be used. In this case, it is sufficient that the size of the indicator lamp 30 is set according to a size of an electronic device to which the indicator lamp 30 is applied. In addition, the electronic device may be mounted, arranged, or suspended and fixed at a predetermined position at the time of use, and the indicator lamp 30 may be arranged at a position at which a height of a line of sight of a user and a height of the indicator lamp do not have a significant difference. Further, the indicator lamp 30 is not limited to the configuration in which the entire side peripheral surface 32 emits light, and may be configured such that only some surfaces of the side peripheral surface 32 that need to be visually recognized by the user emit light. For example, in a case of an electronic device such as an air conditioner installed on a wall, some surfaces of the indicator lamp 30 facing the wall side need not have a function of emitting light, and it is sufficient that only surfaces, other than the surfaces on the wall side, that require light emission, emit light. In this case, it is sufficient that light directivity at the light emitting surface of the indicator lamp is set based on a positional relationship between a height at which the electronic device is installed and the height of the user's eyes. The individual reflecting surface 55 is used to achieve such light directivity. The individual reflecting surface 55 is formed in the surface shape of at least a part of the virtual conical surface or polygonal pyramid surface in which the axis thereof forms the predetermined angle with respect to the traveling direction of the incident parallel light. The angle between the axis of the conical surface or the polygonal pyramid surface defining the surface shape of the individual reflecting surface 55 and the generating line is set so that the reflected light is emitted in a direction of desired directivity. The predetermined angle may be an angle at which the axis of the virtual conical surface or the virtual polygonal pyramid surface is parallel to the traveling direction of the incident parallel light.

Hereinafter, technical ideas ascertained from the embodiments and modification examples will be described together with effects.

(A) An electronic device includes an indicator lamp configured to emit light in a predetermined color when an abnormality occurs in the electronic device, wherein the indicator lamp includes a light source that emits light formed of parallel light, and a light reflecting member on which light emitted from the light source is incident and that reflects the incident light, the light reflecting member includes a reflecting surface at which light is reflected, the reflecting surface includes a plurality of individual reflecting surfaces formed in a surface shape of at least a part of a conical surface or a polygonal pyramid surface having an axis forming a predetermined angle with respect to a traveling direction of incident light, and the plurality of individual reflecting surfaces are arranged side by side in a first direction intersecting the traveling direction of the incident light. In addition, it is possible to reduce a size of the indicator lamp having such characteristics and to improve a degree of freedom in shape.

According to this configuration, in the indicator lamp, light directivity can be provided in the traveling direction of the incident light that is emitted from the light source and is incident on the reflecting surface, and in a direction intersecting the first direction, and a light amount distribution can be made uniform. Therefore, it is easy to ensure the light directivity and the uniformity of the light amount distribution in the directed range, for the indicator lamp. In addition, it is possible to reduce a size of the indicator lamp having such characteristics and to improve a degree of freedom in shape.

(B) In the electronic device according to (A), the light source may include a light emitter and an optical path conversion member that converts light from the light emitter into a parallel light flux and causes the parallel light flux to be incident on the light reflecting member. According to this configuration, parallel light can be incident on the reflecting surface of the light reflecting member. For example, parallel light parallel to the axis of the conical surface or the polygonal pyramid surface defining the shape of the individual reflecting surface constituting the reflecting surface can be incident on the plurality of individual reflecting surfaces. Therefore, it is easy to ensure the light directivity and the uniformity of the light amount distribution of the indicator lamp.

(C) In the electronic device according to (A), the conical surface or the polygonal pyramid surface may have an axis parallel to the traveling direction of the incident light. According to this configuration, even when the conical surface or a polygonal pyramid at least partially formed by the surface shape of the plurality of individual reflecting surfaces have the same shape, light can be emitted so as to be directed at substantially the same angle with respect to the horizontal plane regardless of a position of the indicator lamp.

(D) In the electronic device according to (A), the individual reflecting surface may include a convex reflecting surface that is convex in a direction opposite to the traveling direction of the incident light and that is formed in a surface shape of at least a part of the conical surface or the polygonal pyramid surface, and a concave reflecting surface that is concave in the traveling direction of the incident light and that is formed in a surface shape of at least a part of the conical surface or the polygonal pyramid surface, and the convex reflecting surface and the concave reflecting surface may be arranged side by side in the first direction.

According to this configuration, the plurality of individual reflecting surfaces can be densely arranged in the first direction. For example, by arranging the convex reflecting surface and the concave reflecting surface adjacent to each other, it is possible to increase a rate of parallel light incident on the reflecting surface that can be reflected in a directed direction. Therefore, it is easy to ensure the light directivity and high light emission intensity in the directed direction.

(E) In the electronic device according to (D), the convex reflecting surface may be formed in a surface shape of at least a part of the conical surface or the polygonal pyramid surface in which an apex faces a direction opposite to the traveling direction of the incident light, and the concave reflecting surface may be formed in a surface shape of at least a part of the conical surface or the polygonal pyramid surface in which an apex faces the traveling direction of the incident light.

According to this configuration, since the convex reflecting surface and the concave reflecting surface have the surface shapes in which the directions of the respective apexes of the virtual conical surfaces or polygonal pyramid surfaces at least partially including the surface shapes of the convex reflecting surface and the concave reflecting surface are opposite to each other, the convex reflecting surface and the concave reflecting surface can be densely arranged in the first direction. It is possible to increase the rate of the parallel light incident on the reflecting surface that can be reflected in the directed direction.

(F) In the electronic device according to (E), the convex reflecting surface and the concave reflecting surface may be formed in a surface shape of at least a part of the conical surface, and the convex reflecting surface and the concave reflecting surface may be arranged side by side in the first direction in a state in which generating lines are coupled to each other.

According to this configuration, the convex reflecting surface and the concave reflecting surface can be densely arranged in the first direction. For example, by arranging the convex reflecting surface and the concave reflecting surface adjacent to each other, it is possible to increase a rate of parallel light incident on the reflecting surface that can be reflected in a directed direction. Therefore, it is easy to ensure the light directivity and the high light emission intensity.

(G) In the electronic device according to (E), in the reflecting surface of the light reflecting member, the convex reflecting surface and the concave reflecting surface may be arranged side by side in the first direction in a state in which generating lines are coupled to each other to form an individual reflecting surface row, and a plurality of the individual reflecting surface rows may be arranged in a second direction intersecting the first direction.

According to this configuration, since the plurality of individual reflecting surface rows formed by arranging the convex reflecting surface and the concave reflecting surface side by side in the first direction in the state in which the generating lines are coupled to each other are arranged in the second direction intersecting the first direction, it is possible to expand a light emitting region of the indicator lamp also in the second direction.

(H) In the electronic device according to any one of (A) to (G), the light reflecting member may be made of a transparent resin material. According to this configuration, since the light reflecting member is made of a transparent resin material, attenuation of light when the light passes through the light reflecting member can be suppressed. Therefore, the indicator lamp can emit light at high emission intensity corresponding to light emission intensity of the light source.

(I) In the electronic device according to (G), when the conical surface or the polygonal pyramid surface that is virtual and that defines the surface shape of the individual reflecting surface is assumed, and a narrowing side of the individual reflecting surface is defined as an apex side and a widening side of the individual reflecting surface is defined as a bottom surface side, in a coupling portion between two rows of the individual reflecting surface rows adjacent to each other in the second direction, the apex side of the individual reflecting surface constituting an individual reflecting surface row on one side and the bottom surface side of the individual reflecting surface constituting an individual reflecting surface row on the other side may be arranged in correspondence, and the bottom surface side of the individual reflecting surface on the one side may protrude in a direction of the apex side of the individual reflecting surface on the other side.

According to this configuration, the individual reflecting surface relatively increases a light amount of light, of reflected light, emitted to a front side, and relatively decreases a light amount of light emitted in directions other than the front side. Therefore, it is possible to contribute to the uniformity of the light emission distribution of the indicator lamp.

(J) In the electronic device according to (G), when the conical surface or the polygonal pyramid surface that is virtual and that defines the surface shape of the individual reflecting surface is assumed, and a narrowing side of the individual reflecting surface is defined as an apex side and a widening side of the individual reflecting surface is defined as a bottom surface side, in a coupling portion between two rows of the individual reflecting surface rows adjacent to each other in the second direction, the apex side of the individual reflecting surface constituting an individual reflecting surface row on one side and the bottom surface side of the individual reflecting surface constituting an individual reflecting surface row on the other side may be arranged in correspondence, and the apex side of the individual reflecting surface on the one side may protrude in a direction of the bottom surface side of the individual reflecting surface on the other side.

According to this configuration, the individual reflecting surface relatively decreases a light amount of light, of reflected light, emitted to a front side, and relatively increases a light amount of light emitted in directions other than the front side. Therefore, it is possible to contribute to the uniformity of the light emission distribution of the indicator lamp.

(K) In the electronic device according to (J), the coupling portion between two rows of the individual reflecting surface rows adjacent to each other in the second direction may include both a portion in which the bottom surface side of the individual reflecting surface on the one side protrudes in the direction of the apex side of the individual reflecting surface on the other side, and a portion in which the apex side of the individual reflecting surface on the one side protrudes in the direction of the bottom surface side of the individual reflecting surface on the other side.

According to this configuration, both of the two types of individual reflecting surfaces having different reflection characteristics are provided. That is, the individual reflecting surface on the one side relatively decreases a light amount of light, of reflected light, emitted to the front side, and relatively increases a light amount of light emitted in directions other than the front side. The individual reflecting surface on the other side relatively increases a light amount of light, of reflected light, emitted to the front side, and relatively decreases a light amount of light emitted in directions other than the front side. Therefore, the light emission distribution of the indicator lamp can be made more uniform.

(L) In the electronic device according to (J), the light reflecting member is constituted by a light guide component that transmits light, the reflecting surface is constituted by an interface between the light guide component and the atmosphere, and an incident angle of incident light with respect to the reflecting surface is greater than a critical angle. According to this configuration, since the incident light is reflected by the reflecting surface, it is possible to ensure the high light emission intensity in the directed direction of the indicator lamp.

(M) In the electronic device according to (J), the reflecting surface of the light reflecting member may be processed to reflect light. According to this configuration, since a rate of incident light that is reflected by the reflecting surface is increased, it is possible to ensure the high light emission intensity in the directed direction of the indicator lamp.

(N) In the electronic device according to (J), an angle formed by the reflecting surface and incident light may be from 40 degrees to 45 degrees. According to this configuration, the reflecting surface can reflect light in a direction forming an angle within a range from 90 degrees to 100 degrees with respect to the incident light. For example, when the incident light is incident upward in the vertical direction, the reflecting surface can reflect light directed obliquely upward by a predetermined angle within a range from 0 to 10 degrees with respect to the horizontal. For example, when the indicator lamp is arranged at the electronic device, the indicator lamp can emit light directed to the height of the user's eyes. Therefore, the user can easily notice the light emission of the indicator lamp.

(O) In the electronic device according to (J), the indicator lamp may emit light in a plurality of colors. According to this configuration, since light is emitted in a plurality of colors, various information can be notified by a combination of light emission colors in addition to a light emission mode.

(P) A light reflecting member on which light formed of parallel light emitted from a light source is incident and that reflects the incident light includes a reflecting surface at which light is reflected, wherein at the reflecting surface, individual reflecting surfaces formed in a surface shape of at least a part of a conical surface or a polygonal pyramid surface having an axis forming a predetermined angle with respect to a traveling direction of the incident light are arranged side by side in a first direction intersecting the traveling direction of the incident light. According to this configuration, when the light reflecting member is used for the indicator lamp, it is easy to ensure the light directivity of the indicator lamp and the uniformity of the light amount distribution in the directed range.

(Q) An indicator lamp in the electronic device according to any one of (A) to (O) includes the light source and the light reflecting member. According to this configuration, it is easy to ensure the light directivity of the indicator lamp and the uniformity of the light amount distribution in the directed range.

What is claimed is:

1. An electronic device comprising
an indicator lamp configured to emit light in a predetermined color when an abnormality occurs in the electronic device, wherein
the indicator lamp includes
a light source configured to emit light formed of parallel light and
a light reflecting member on which light emitted from the light source is incident and that reflects the incident light,
the light reflecting member includes a reflecting surface at which light is reflected,
the reflecting surface includes a plurality of individual reflecting surfaces formed in a surface shape of at least a part of a convex conical reflecting surface that is convex in a direction opposite to a traveling direction of the incident light and is formed in a surface shape of at least a part of a virtual conical surface defining the surface shape of the convex reflecting surface that has an apex facing the direction opposite to the traveling direction of the incident light,
the plurality of individual reflecting surfaces are arranged side by side in a first direction intersecting the traveling direction of the incident light, and
the light source includes
a light emitter, and
an optical path conversion member converting light from the light emitter into a parallel light flux and cause the parallel light flux to be incident on the light reflecting member.

2. The electronic device according to claim 1, wherein the conical surface has an axis parallel to the traveling direction of the incident light.

3. The electronic device according to claim 1, wherein the individual reflecting surface includes the convex reflecting surface that is formed in a surface shape of at least a part of the conical surface, and a concave reflecting surface that is concave in the traveling direction of the incident light and that is formed in a surface shape of at least a part of the conical surface or the polygonal pyramid surface, and the convex reflecting surface and the concave reflecting surface are arranged side by side in the first direction.

4. The electronic device according to claim 1, wherein the light reflecting member is made of a transparent resin material.

5. The electronic device according to claim 1, wherein the light reflecting member is constituted by a light guide component that transmits light,
the reflecting surface is constituted by an interface between the light guide component and atmosphere, and
an incident angle of incident light with respect to the reflecting surface is greater than a critical angle.

6. The electronic device according to claim 1, wherein the reflecting surface of the light reflecting member is processed to reflect light.

7. The electronic device according to claim 1, wherein an angle formed by the reflecting surface and the incident light is from 40 degrees to 45 degrees.

8. The electronic device according to claim 1, wherein the indicator lamp emits light in a plurality of colors.

9. The electronic device according to claim 3, wherein the convex reflecting surface is formed in a surface shape of at least a part of the conical surface or the polygonal pyramid surface in which an apex faces the direction opposite to the traveling direction of the incident light and
the concave reflecting surface is formed in a surface shape of at least a part of the conical surface or the polygonal pyramid surface in which an apex faces the traveling direction of the incident light.

10. The electronic device according to claim 9, wherein the convex reflecting surface and the concave reflecting surface are formed in a surface shape of at least a part of the conical surface and
the convex reflecting surface and the concave reflecting surface are arranged side by side in the first direction in a state in which generating lines are coupled to each other.

11. The electronic device according to claim 9, wherein in the reflecting surface of the light reflecting member, the convex reflecting surface and the concave reflecting surface are arranged side by side in the first direction in a state in which generating lines are coupled to each other to form an individual reflecting surface row, and a plurality of the individual reflecting surface rows are arranged in a second direction intersecting the first direction.

12. The electronic device according to claim 11, wherein in the conical surface that is virtual or the polygonal pyramid surface and that defines the surface shape of the individual reflecting surface, and a narrowing side of the individual reflecting surface is defined as an apex side and a widening side of the individual reflecting surface is defined as a bottom surface side,
in a coupling portion between two rows of the individual reflecting surface rows adjacent to each other in the second direction, the apex side of the individual reflecting surface constituting the individual reflecting surface row on one side and the bottom surface side of the individual reflecting surface constituting the individual reflecting surface row on the other side are arranged in adjacency, and the bottom surface side of the individual reflecting surface on the one side protrudes in a direction of the apex side of the individual reflecting surface on the other side.

13. The electronic device according to claim 11, wherein in the conical surface that is virtual or the polygonal pyramid surface and that defines the surface shape of the individual reflecting surface, and a narrowing side of the individual reflecting surface is defined as an apex side and a widening side of the individual reflecting surface is defined as a bottom surface side,
in a coupling portion between two rows of the individual reflecting surface rows adjacent to each other in the second direction, the apex side of the individual reflecting surface constituting the individual reflecting surface row on one side and the bottom surface side of the individual reflecting surface constituting the individual reflecting surface row on the other side are arranged in adjacency, and the apex side of the individual reflecting surface on the one side protrudes in a direction of the bottom surface side of the individual reflecting surface on the other side.

14. The electronic device according to claim 13, wherein the coupling portion between the two rows of the individual reflecting surface rows adjacent to each other in the second direction includes both a portion in which the bottom surface side of the individual reflecting surface on the one side protrudes in a direction of the apex side of the individual reflecting surface on the other side, and a portion in which the apex side of the individual reflecting surface on the one side protrudes in the direction of the bottom surface side of the individual reflecting surface on the other side.

15. A light reflecting member on which light formed of parallel light emitted from a light source is incident and that reflects the incident light, the light reflecting member comprising
a reflecting surface at which light is reflected, wherein
at the reflecting surface, individual reflecting surfaces formed in a surface shape of at least a part of a convex conical reflecting surface that is convex in a direction opposite to a traveling direction of the incident light and is formed in a surface shape of at least a part of a virtual conical surface defining the surface shape of the convex reflecting surface that has an apex facing the direction opposite to the traveling direction of the incident light, and
the light source includes
a light emitter, and
an optical path conversion member converting light from the light emitter into a parallel light flux and cause the parallel light flux to be incident on the light reflecting member.

16. An indicator lamp that emits light in a predetermined color, the indicator lamp comprising:
a light source configured to emit light formed of parallel light; and
a light reflecting member on which light emitted from the light source is incident and that is configured to reflect the incident light, wherein
the light reflecting member includes a reflecting surface at which light is reflected,
the reflecting surface includes a plurality of individual reflecting surfaces formed in a surface shape of at least a part of a convex conical reflecting surface that is convex in a direction opposite to a traveling direction of the incident light and is formed in a surface shape of at least a part of a virtual conical surface defining the surface shape of the convex reflecting surface that has an apex facing the direction opposite to the traveling direction of the incident light,
the plurality of individual reflecting surfaces are arranged side by side in a first direction intersecting the traveling direction of the incident light, and
the light source includes
a light emitter, and
an optical path conversion member converting light from the light emitter into a parallel light flux and cause the parallel light flux to be incident on the light reflecting member.

* * * * *